United States Patent
Yeager et al.

(10) Patent No.: US 7,354,533 B2
(45) Date of Patent: *Apr. 8, 2008

(54) ELECTRICALLY CONDUCTIVE THERMOSET COMPOSITION, METHOD FOR THE PREPARATION THEREOF, AND ARTICLES DERIVED THEREFROM

(75) Inventors: Gary William Yeager, Rexford, NY (US); Manuel Cavazos, West Coxsackie, NY (US); Hua Guo, Selkirk, NY (US); Glen David Merfeld, Loudonville, NY (US); John Rude, Clifton Park, NY (US); Erich Otto Teutsch, Richmond, MA (US); Kenneth Paul Zarnoch, Scotia, NY (US)

(73) Assignee: General Electric Company, Schenectady, NY (US)

(*) Notice: Subject to any disclaimer, the term of this patent is extended or adjusted under 35 U.S.C. 154(b) by 463 days.

This patent is subject to a terminal disclaimer.

(21) Appl. No.: 10/977,797

(22) Filed: Oct. 29, 2004

(65) Prior Publication Data

US 2005/0109990 A1 May 26, 2005

Related U.S. Application Data

(62) Division of application No. 09/683,214, filed on Dec. 3, 2001, now Pat. No. 6,905,637.

(60) Provisional application No. 60/262,522, filed on Jan. 18, 2001, provisional application No. 60/306,017, filed on Jul. 17, 2001.

(51) Int. Cl.
C08K 3/04 (2006.01)
C08K 3/08 (2006.01)
C08L 71/02 (2006.01)
C08F 283/08 (2006.01)
H01B 1/20 (2006.01)

(52) U.S. Cl. ............ 252/511; 252/500; 252/502; 252/503; 525/391; 525/537; 525/132; 524/435; 524/495; 524/496; 264/104; 429/34; 429/129; 429/247

(58) Field of Classification Search ............ None
See application file for complete search history.

(56) References Cited

U.S. PATENT DOCUMENTS

| | | |
|---|---|---|
| 3,219,625 A | 11/1965 | Blanchard et al. |
| 3,268,561 A | 8/1966 | Peppel et al. |
| 3,280,089 A | 10/1966 | Wright |
| 3,281,383 A | 10/1966 | Zelinski et al. |
| 3,285,895 A | 11/1966 | MacKenzie et al. |
| 3,306,875 A | 2/1967 | Hay |
| 3,356,761 A | 12/1967 | Fox |
| 3,375,228 A | 3/1968 | Holoch et al. |
| 3,476,722 A | 11/1969 | Schlatzer |
| 3,557,045 A | 1/1971 | Wright et al. |
| 3,575,923 A | 4/1971 | Jones |
| 3,595,942 A | 7/1971 | Wald et al. |
| 3,597,216 A | 8/1971 | Berardinelli et al. |
| 3,637,578 A | 1/1972 | Wright et al. |
| 3,808,286 A | 4/1974 | Olund |
| 3,883,612 A | 5/1975 | Pratt et al. |
| 3,936,414 A | 2/1976 | Wright et al. |
| 3,960,516 A | 6/1976 | Biardi |
| 3,996,195 A | 12/1976 | Sato et al. |
| 4,011,200 A | 3/1977 | Yonemitsu et al. |
| 4,028,341 A | 6/1977 | Hay |
| 4,038,343 A | 7/1977 | Yonemitsu et al. |
| 4,048,143 A | 9/1977 | Hay et al. |
| 4,054,425 A | 10/1977 | Sherman |
| 4,081,418 A | 3/1978 | Barua et al. |
| 4,088,729 A | 5/1978 | Sherman |
| 4,092,294 A | 5/1978 | Bennett, Jr. et al. |
| 4,131,729 A | 12/1978 | Schmitt et al. |
| 4,148,843 A | 4/1979 | Goossens |
| 4,158,736 A | 6/1979 | Lewis et al. |
| 4,165,422 A | 8/1979 | White |
| 4,172,951 A | 10/1979 | Gruber et al. |
| 4,230,767 A | 10/1980 | Isaka et al. |
| 4,246,217 A | 1/1981 | Hottel, Jr. et al. |
| 4,257,936 A | 3/1981 | Matsumoto et al. |
| 4,298,718 A | 11/1981 | Mayr et al. |
| 4,327,013 A | 4/1982 | Peters |

(Continued)

FOREIGN PATENT DOCUMENTS

DE 31 17 514 A1 2/1981

(Continued)

OTHER PUBLICATIONS

Derwent Abstract of DE 3117574 A1.

(Continued)

*Primary Examiner*—Stanley S. Silverman
*Assistant Examiner*—Kallambella Vijayakumar
(74) *Attorney, Agent, or Firm*—Cantor Colburn LLP

(57) ABSTRACT

A conductive thermosetting composition comprises a functionalized poly(arylene ether), an alkenyl aromatic monomer, an acryloyl monomer, and a conductive agent. After curing, the composition exhibits good stiffness, toughness, heat resistance, and conductivity, and it is useful in the fabrication of a variety of conductive components, including the bipolar plates of fuel cells.

21 Claims, No Drawings

U.S. PATENT DOCUMENTS

| | | | |
|---|---|---|---|
| 4,337,349 A | 6/1982 | Orlowski et al. |
| 4,359,438 A | 11/1982 | Hoggins et al. |
| 4,440,923 A | 4/1984 | Bartmann et al. |
| RE31,883 E | 5/1985 | Bovenkerk et al. |
| 4,521,491 A | 6/1985 | Oizumi et al. |
| 4,544,717 A | 10/1985 | Mayr et al. |
| 4,562,243 A | 12/1985 | Percec |
| 4,565,684 A | 1/1986 | Tibbetts et al. |
| 4,572,813 A | 2/1986 | Arakawa |
| 4,579,904 A | 4/1986 | Orlowski et al. |
| 4,604,417 A | 8/1986 | Cottman |
| 4,618,703 A | 10/1986 | Thanawalla et al. |
| 4,634,742 A | 1/1987 | Percec |
| 4,659,528 A | 4/1987 | Plowman et al. |
| 4,663,230 A | 5/1987 | Tennent |
| 4,663,402 A | 5/1987 | Percec et al. |
| 4,664,971 A | 5/1987 | Soens |
| 4,665,137 A | 5/1987 | Percec et al. |
| 4,677,185 A | 6/1987 | Heitz et al. |
| 4,701,514 A | 10/1987 | Percec |
| 4,760,118 A | 7/1988 | White et al. |
| H521 H | 9/1988 | Fan |
| 4,794,096 A | 12/1988 | Ewen |
| 4,806,601 A | 2/1989 | Percec |
| 4,816,289 A | 3/1989 | Komatsu et al. |
| 4,816,515 A | 3/1989 | Weiss |
| 4,855,351 A | 8/1989 | Stein |
| 4,871,816 A | 10/1989 | Percec et al. |
| 4,874,826 A | 10/1989 | Sakamoto et al. |
| 4,876,078 A | 10/1989 | Arakawa et al. |
| 4,888,397 A | 12/1989 | van der Meer et al. |
| 4,923,932 A | 5/1990 | Katayose et al. |
| 4,923,942 A | 5/1990 | Takeyama et al. |
| 4,975,403 A | 12/1990 | Ewen |
| 5,021,523 A | 6/1991 | Iizuka |
| 5,024,818 A | 6/1991 | Tibbetts et al. |
| 5,039,781 A | 8/1991 | Neugebauer et al. |
| 5,053,496 A | 10/1991 | Bertsch et al. |
| 5,061,602 A | 10/1991 | Koch et al. |
| 5,071,922 A | 12/1991 | Nelissen et al. |
| 5,079,268 A | 1/1992 | Nelissen et al. |
| 5,091,480 A | 2/1992 | Percec et al. |
| 5,165,909 A | 11/1992 | Tennent et al. |
| 5,171,761 A | 12/1992 | Penco et al. |
| 5,189,116 A | 2/1993 | Boyd et al. |
| 5,198,510 A | 3/1993 | Siebert et al. |
| 5,200,122 A | 4/1993 | Katoh et al. |
| 5,213,886 A | 5/1993 | Chao et al. |
| 5,218,030 A | 6/1993 | Katayose et al. |
| 5,219,951 A | 6/1993 | Nelissen et al. |
| 5,240,973 A | 8/1993 | Katoh et al. |
| 5,241,015 A | 8/1993 | Chou |
| 5,243,002 A | 9/1993 | Razavi |
| 5,304,600 A | 4/1994 | Nelissen et al. |
| 5,306,318 A | 4/1994 | Carius et al. |
| 5,308,811 A | 5/1994 | Suga et al. |
| 5,310,820 A | 5/1994 | Nelissen et al. |
| 5,314,512 A | 5/1994 | Sexton |
| 5,332,801 A | 7/1994 | Tsukahara et al. |
| 5,338,796 A | 8/1994 | Vianello et al. |
| 5,352,745 A | 10/1994 | Katayose et al. |
| 5,397,608 A | 3/1995 | Soens |
| 5,405,896 A | 4/1995 | Fujiki et al. |
| 5,407,972 A | 4/1995 | Smith et al. |
| 5,444,134 A | 8/1995 | Matsumoto |
| 5,584,893 A | 12/1996 | Mitchell |
| 5,589,152 A | 12/1996 | Tennent et al. |
| 5,591,382 A | 1/1997 | Nashass et al. |
| 5,612,425 A * | 3/1997 | Weber et al. ............... 525/534 |
| 5,834,565 A | 11/1998 | Tracy et al. |
| 5,851,382 A | 12/1998 | Sudhakar |
| 5,851,646 A | 12/1998 | Takahashi et al. |
| 5,885,149 A | 3/1999 | Gillet et al. |
| 5,922,815 A | 7/1999 | Aycock et al. |
| 5,965,663 A | 10/1999 | Hayase |
| 6,022,550 A | 2/2000 | Watanabe |
| 6,042,702 A | 3/2000 | Kolouch et al. |
| 6,051,368 A | 4/2000 | Masuko et al. |
| 6,090,872 A | 7/2000 | Albe et al. |
| 6,103,413 A | 8/2000 | Hinton et al. |
| 6,248,467 B1 | 6/2001 | Wilson et al. |
| 6,251,308 B1 | 6/2001 | Butler |
| 6,306,963 B1 | 10/2001 | Lane et al. |
| 6,365,069 B2 | 4/2002 | Butler et al. |
| 6,384,176 B1 | 5/2002 | Braat et al. |
| 6,436,315 B2 | 8/2002 | Butler |
| 6,469,124 B2 | 10/2002 | Braat et al. |
| 6,521,703 B2 | 2/2003 | Zarnoch et al. |
| 6,593,391 B2 | 7/2003 | Teutsch et al. |
| 6,617,398 B2 * | 9/2003 | Yeager et al. ............... 525/391 |
| 6,627,704 B2 | 9/2003 | Yeager et al. |
| 6,627,708 B2 | 9/2003 | Braat et al. |
| 6,627,798 B2 | 9/2003 | Falco et al. |
| 6,794,481 B2 | 9/2004 | Amagai et al. |
| 6,812,276 B2 | 11/2004 | Yeager |
| 6,878,781 B2 | 4/2005 | Zarnoch et al. |
| 6,878,782 B2 | 4/2005 | Merfeld et al. |
| 6,897,282 B2 | 5/2005 | Freshour et al. |
| 6,905,637 B2 | 6/2005 | Yeager et al. |
| 2001/0049046 A1 | 12/2001 | Butler |
| 2001/0053450 A1 * | 12/2001 | Yeager et al. ............... 428/461 |
| 2001/0053820 A1 * | 12/2001 | Yeager et al. ............... 525/186 |
| 2002/0005508 A1 | 1/2002 | Butler et al. |
| 2002/0028337 A1 | 3/2002 | Yeater et al. |
| 2002/0077447 A1 | 6/2002 | Hwang et al. |
| 2002/0173597 A1 | 11/2002 | Zarnoch et al. |
| 2003/0215588 A1 | 11/2003 | Yeager et al. |
| 2004/0146692 A1 | 7/2004 | Inoue et al. |

FOREIGN PATENT DOCUMENTS

| | | |
|---|---|---|
| DE | 41 03 140 A1 | 2/1991 |
| EP | 0 135 124 A2 | 10/1984 |
| EP | 0 206 072 B2 | 9/1986 |
| EP | 0 261 574 B1 | 9/1987 |
| EP | 0 385 065 A1 | 10/1990 |
| EP | 0 498 088 A1 | 11/1991 |
| NL | 6902092 | 8/1989 |
| WO | WO 93/13251 | 7/1993 |
| WO | WO 98/19389 | 4/1999 |
| WO | WO 01/40354 A1 | 6/2001 |
| WO | WO 01/53413 | 7/2001 |

OTHER PUBLICATIONS

International Search Report Dated Jul. 15, 2003.
WO 03/076495; Sep. 18, 2003; Translation (29 pages).
Chemical Abstract 109:171608; JP63083152A2; Apr. 13, 1988 (2 pages).
Chemical Abstract 125:12414; JP08048841A2; Feb. 20, 1996 (4 pages).
Chemical Abstract 98:73296; JP57145148A2; Sep. 8, 1982 (2 pages).
Chemical Abstract 99:213561; JP58141240A2; Aug. 22, 1983 (2 pages).
Patent Abstracts of Japan; Publication No. 07-268205; Date of Publication of Application Oct. 17, 1995; (2 pages).
Patent Abstracts of Japan; Publication No. 08-012875; Date of Publication of Application Jan. 16, 1996; (1 page).
Patent Abstracts of Japan; Publication No. 11-080536; Date of Publication of Application Mar. 26, 1999; (2 pages).

Chemical Abstract 106:103480; JP61174208A2; Aug. 5, 1986 (1 page).
Chemical Abstract 107:97840; JP61287913A2; Dec. 18, 1986 (1 page).
Chan et al., Facile Quantitative Analysis of Hydroxyl End Groups of Poly(2,6-dimethyl-1,4-phenylene oxide)s by 31P NMR Spectroscopy, Macromolecutes, 27 (1994) pp. 6371-6375.

Li et al., "Shrinkage Control of Low-Profile Unsaturated Polyester Resins Cured at Low Temperature", Polymer, vol. 39, No. 23, 1998, pp. 5677-5687.

* cited by examiner

ELECTRICALLY CONDUCTIVE THERMOSET COMPOSITION, METHOD FOR THE PREPARATION THEREOF, AND ARTICLES DERIVED THEREFROM

CROSS REFERENCE TO RELATED APPLICATIONS

This application is a division of U.S. Nonprovisional application Ser. No. 09/683,214 filed 3 Dec. 2001, now U.S. Pat. No. 6,905,637 which claims the benefit of U.S. Provisional Application Ser. Nos. 60/262,522 filed 18 Jan. 2001 and 60/306,017 filed 17 Jul. 2001.

BACKGROUND

Thermoset molding compositions known in the art are generally thermosetting resins containing inorganic fillers and/or fibers. Upon heating, thermoset monomers initially exhibit viscosities low enough to allow for melt processing and molding of an article from the filled monomer composition. Upon further heating the thermosetting monomers react and cure to form hard resins with high stiffness.

Although conductive thermoset compositions are known, their commercial adoption has been limited by deficiencies in one or more properties such as curing rate, toughness, stiffness, heat resistance, chemical resistance, and conductivity.

BRIEF SUMMARY

The above described disadvantages are overcome by a composition comprising: a functionalized poly(arylene ether); an alkenyl aromatic monomer; an acryloyl monomer; and a conductive agent.

The compositions are useful in a variety of conductive articles, including components of electrochemical cells, such as the bipolar plates employed in fuel cells.

Other embodiments, including a method of preparing the composition, are described below.

DETAILED DESCRIPTION OF THE PREFERRED EMBODIMENTS

One embodiment is a conductive thermoset composition comprising: a functionalized poly(arylene ether); an alkenyl aromatic monomer; an acryloyl monomer; and a conductive agent.

The present inventors have found that this composition provides a highly desirable combination of fast curing, reduced curing rate oxygen sensitivity, high toughness, high stiffness, high heat resistance, high moisture absorption resistance, and high conductivity. At least one of these properties is compromised if any of the components is omitted.

The composition comprises a functionalized poly(arylene ether), which may be a capped poly(arylene ether) or a ring-functionalized poly(arylene ether), each of which is defined below.

The functionalized poly(arylene ether) may be a capped poly(arylene ether). A capped poly(arylene ether) is defined herein as a poly(arylene ether) in which at least 50%, preferably at least 75%, more preferably at least 90%, yet more preferably at least 95%, even more preferably at least 99%, of the free hydroxyl groups present in the corresponding uncapped poly(arylene ether) have been functionalized by reaction with a capping agent.

The capped poly(arylene ether) may be represented by the structure

wherein Q is the residuum of a monohydric, dihydric, or polyhydric phenol, preferably the residuum of a monohydric or dihydric phenol, more preferably the residuum of a monohydric phenol; y is 1 to 100; J comprises recurring units having the structure

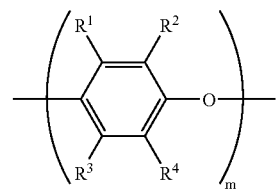

wherein m is 1 to about 200, preferably 2 to about 200, and $R^1$-$R^4$ are each independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbonoxy, $C_2$-$C_{12}$ halohydrocarbonoxy wherein at least two carbon atoms separate the halogen and oxygen atoms, or the like; and K is a capping group produced by reaction of a phenolic hydroxyl group on the poly(arylene ether) with a capping reagent. The resulting capping group may be

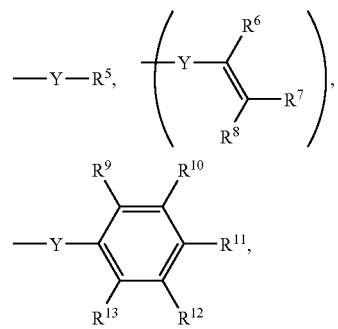

or the like, wherein $R^5$ is $C_1$-$C_{12}$ alkyl, or the like; $R^6$-$R^8$ are each independently hydrogen, $C_1$-$C_{12}$ alkyl, $C_2$-$C_{12}$ alkenyl, $C_6$-$C_{18}$ aryl, $C_7$-$C_{18}$ alkyl-substituted aryl, $C_7$-$C_{18}$ aryl-substituted alkyl, $C_2$-$C_{12}$ alkoxycarbonyl, $C_7$-$C_{18}$ aryloxycarbonyl, $C_7$-$C_{18}$ alkyl-substituted aryloxycarbonyl, $C_7$-$C_{18}$ aryl-substituted alkoxycarbonyl, nitrile, formyl, carboxylate, imidate, thiocarboxylate, or the like; $R^9$-$R^{13}$ are each independently hydrogen, halogen, $C_1$-$C_{12}$ alkyl, hydroxy, amino, or the like; and wherein Y is a divalent group such as

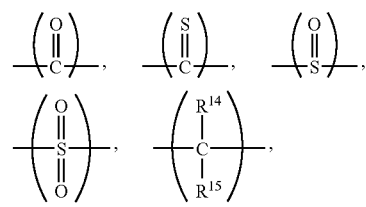

or the like, wherein $R^{14}$ and $R^{15}$ are each independently hydrogen, $C_1$-$C_{12}$ alkyl, or the like.

In one embodiment, Q is the residuum of a phenol, including polyfunctional phenols, and includes radicals of the structure

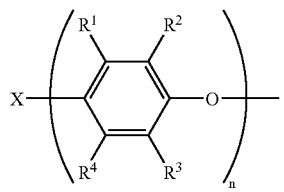

wherein $R^1$-$R^4$ are each independently hydrogen, halogen, primary or secondary $C_1$-$C_{12}$ alkyl, $C_1$-$C_{12}$ alkenyl, $C_1$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ aminoalkyl, $C_1$-$C_{12}$ hydrocarbonoxy, $C_1$-$C_{12}$ halohydrocarbonoxy wherein at least two carbon atoms separate the halogen and oxygen atoms, or the like; X may be hydrogen, $C_1$-$C_{12}$ alkyl, $C_6$-$C_{18}$ aryl, $C_7$-$C_{18}$ alkyl-substituted aryl, $C_7$-$C_{18}$ aryl-substituted alkyl, or any of the foregoing hydrocarbon groups containing at least one substituent such as carboxylic acid, aldehyde, alcohol, amino radicals, or the like; X also may be sulfur, sulfonyl, sulfuryl, oxygen, or other such bridging group having a valence of 2 or greater to result in various bis- or higher polyphenols; y and n are each independently 1 to about 100, preferably 1 to 3, and more preferably about 1 to 2; in a preferred embodiment, y=n. Q may also be the residuum of a diphenol, such as 2,2',6,6'-tetramethyl-4,4'-diphenol.

In one embodiment, the capped poly(arylene ether) is produced by capping a poly(arylene ether) consisting essentially of the polymerization product of at least one monohydric phenol having the structure

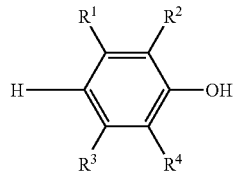

wherein $R^1$-$R^4$ are each independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbonoxy, $C_2$-$C_{12}$ halohydrocarbonoxy wherein at least two carbon atoms separate the halogen and oxygen atoms, or the like. Suitable monohydric phenols include those described in U.S. Pat. No. 3,306,875 to Hay, and highly preferred monohydric phenols include 2,6-dimethylphenol and 2,3,6-trimethylphenol. The poly(arylene ether) may be a copolymer of at least two monohydric phenols, such as 2,6-dimethylphenol and 2,3,6-trimethylphenol.

In a preferred embodiment, the capped poly(arylene ether) comprises at least one capping group having the structure

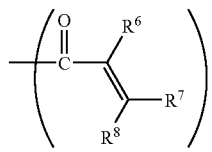

wherein $R^6$-$R^8$ are each independently hydrogen, $C_1$-$C_{12}$ alkyl, $C_2$-$C_{12}$ alkenyl, $C_6$-$C_{18}$ aryl, $C_7$-$C_{18}$ alkyl-substituted aryl, $C_7$-$C_{18}$ aryl-substituted alkyl, $C_2$-$C_{12}$ alkoxycarbonyl, $C_7$-$C_{18}$ aryloxycarbonyl, $C_7$-$C_{18}$ alkyl-substituted aryloxycarbonyl, $C_7$-$C_{18}$ aryl-substituted alkoxycarbonyl, nitrile, formyl, carboxylate, imidate, thiocarboxylate, or the like. Highly preferred capping groups include acrylate ($R^6$=$R^7$=$R^8$=hydrogen) and methacrylate ($R^6$=methyl, $R^7$=$R^8$=hydrogen).

In another preferred embodiment, the capped poly(arylene ether) comprises at least one capping group having the structure

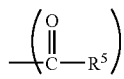

wherein $R^5$ is $C_1$-$C_{12}$ alkyl, preferably $C_1$-$C_6$ alkyl, more preferably methyl, ethyl, or isopropyl. The present inventors have surprisingly found that the advantageous properties of their invention can be achieved even when the capped poly(arylene ether) lacks a polymerizable function such as a carbon-carbon double bond.

In yet another preferred embodiment, the capped poly(arylene ether) comprises at least one capping group having the structure

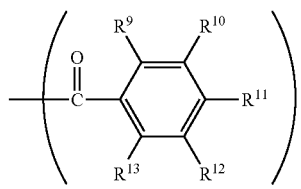

wherein $R^9$-$R^{13}$ are each independently hydrogen, halogen, $C_1$-$C_{12}$ alkyl, hydroxy, amino, or the like. Preferred capping groups of this type include salicylate ($R^9$=hydroxy, $R^{10}$—$R^{13}$=hydrogen).

In still another preferred embodiment, the capped poly(arylene ether) comprises at least one capping group having the structure

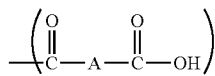

wherein A is a saturated or unsaturated $C_2$-$C_{12}$ divalent hydrocarbon group such as, for example, ethylene, 1,2-propylene, 1,3-propylene, 2-methyl-1,3-propylene, 2,2-dimethyl-1,3-propylene, 1,2-butylene, 1,3-butylene, 1,4-butylene, 2-methyl-1,4-butylene, 2,2-dimethyl-1,4-butylene, 2,3-dimethyl-1,4-butylene, vinylene (—CH═CH—), 1,2-phenylene, and the like. These capped poly(arylene ether) resins may conveniently be prepared, for example, by reaction of an uncapped poly(arylene ether) with a cyclic anhydride capping agent. Such cyclic anhydride capping agents include, for example, maleic anhydride, succinic anhydride, glutaric anhydride, adipic anhydride, phthalic anhydride, and the like.

There is no particular limitation on the method by which the capped poly(arylene ether) is prepared. The capped poly(arylene ether) may be formed by the reaction of an uncapped poly(arylene ether) with a capping agent. Capping agents include compounds known in the literature to react with phenolic groups. Such compounds include both monomers and polymers containing, for example, anhydride, acid chloride, epoxy, carbonate, ester, isocyanate, cyanate ester, or alkyl halide radicals. Capping agents are not limited to organic compounds as, for example, phosphorus and sulfur based capping agents also are included. Examples of capping agents include, for example, acetic anhydride, succinic anhydride, maleic anhydride, salicylic anhydride, polyesters comprising salicylate units, homopolyesters of salicylic acid, acrylic anhydride, methacrylic anhydride, glycidyl acrylate, glycidyl methacrylate, acetyl chloride, benzoyl chloride, diphenyl carbonates such as di(4-nitrophenyl)carbonate, acryloyl esters, methacryloyl esters, acetyl esters, phenylisocyanate, 3-isopropenyl-alpha,alpha-dimethylphenylisocyanate, cyanatobenzene, 2,2-bis(4-cyanatophenyl) propane), 3-(alpha-chloromethyl)styrene, 4-(alpha-chloromethyl)styrene, allyl bromide, and the like, carbonate and substituted derivatives thereof, and mixtures thereof. These and other methods of forming capped poly(arylene ether)s are described, for example, in U.S. Pat. No. 3,375,228 to Holoch et al.; U.S. Pat. No. 4,148,843 to Goossens; U.S. Pat. Nos. 4,562,243, 4,663,402, 4,665,137, and 5,091,480 to Percec et al.; U.S. Pat. Nos. 5,071,922, 5,079,268, 5,304,600, and 5,310,820 to Nelissen et al.; U.S. Pat. No. 5,338,796 to Vianello et al.; and European Patent No. 261,574 B1 to Peters et al.

In a preferred embodiment, the capped poly(arylene ether) may be prepared by reaction of an uncapped poly (arylene ether) with an anhydride in an alkenyl aromatic monomer as solvent. This approach has the advantage of generating the capped poly(arylene ether) in a form that can be immediately blended with other components to form a curable composition; using this method, no isolation of the capped poly(arylene ether) or removal of unwanted solvents or reagents is required.

A capping catalyst may be employed in the reaction of an uncapped poly(arylene ether) with an anhydride. Examples of such compounds include those known to the art that are capable of catalyzing condensation of phenols with the capping agents described above. Useful materials are basic compounds including, for example, basic compound hydroxide salts such as sodium hydroxide, potassium hydroxide, tetraalkylammonium hydroxides, and the like; tertiary alkylamines such as tributyl amine, triethylamine, dimethylbenzylamine, dimethylbutylamine and the like; tertiary mixed alkyl-arylamines and substituted derivatives thereof such as N,N-dimethylaniline; heterocyclic amines such as imidazoles, pyridines, and substituted derivatives thereof such as 2-methylimidazole, 2-vinylimidazole, 4-(dimethylamino)pyridine, 4-(1-pyrrolino)pyridine, 4-(1-piperidino)pyridine, 2-vinylpyridine, 3-vinylpyridine, 4-vinylpyridine, and the like. Also useful are organometallic salts such as, for example, tin and zinc salts known to catalyze the condensation of, for example, isocyanates or cyanate esters with phenols. The organometallic salts useful in this regard are known to the art in numerous publications and patents well known to those skilled in this art.

The functionalized poly(arylene ether) may be a ring-functionalized poly(arylene ether). A ring-functionalized poly(arylene ether) is defined herein as a poly(arylene ether) comprising repeating units of the formula

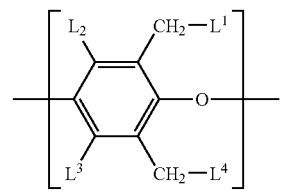

wherein each $L^1$-$L^4$ is independently hydrogen, an alkenyl group, or an alkynyl group; wherein the alkenyl group is represented by

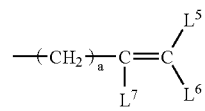

wherein $L^5$-$L^7$ are independently hydrogen or methyl, and a is an integer from 1 to 4; wherein the alkynyl group is represented by

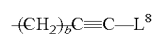

wherein $L^8$ is hydrogen, methyl, or ethyl, and b is an integer from 1 to 4; and wherein about 0.02 mole percent to about 25 mole percent of the total $L^1$-$L^4$ substituents in the ring-functionalized poly(arylene ether) are alkenyl and/or alkynyl groups. Within this range, it may be preferred to have at least about 0.1 mole percent, more preferably at least about 0.5 mole percent, alkenyl and/or alkynyl groups. Also within this range, it may be preferred to have up to about 15 mole percent, more preferably up to about 10 mole percent, alkenyl and/or alkynyl groups.

The ring-functionalized poly(arylene ether) may be prepared according to known methods. For example, an unfunctionalized poly(arylene ether) such as poly(2,6-dimethyl-1,4-phenylene ether) may be metalized with a reagent such as n-butyl lithium and subsequently reacted with an alkenyl halide such as allyl bromide and/or an alkynyl halide such as propargyl bromide. This and other methods for preparation of ring-functionalized poly(arylene ether) resins are described, for example, in U.S. Pat. No. 4,923,932 to Katayose et al.

It will be understood that the poly(arylene ether)s described herein as "uncapped" or "unfunctionalized" comprise repeating units having the formula

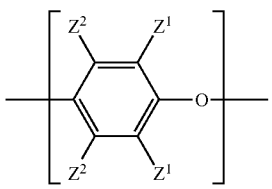

wherein for each structural unit, each $Z^1$ is independently hydrogen, halogen, primary or secondary $C_1$-$C_{12}$ alkyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbonoxy, $C_1$-$C_{12}$ halohydrocarbonoxy wherein at least two carbon atoms separate the halogen and oxygen atoms, or the like; and each $Z^2$ is independently halogen, primary or secondary $C_1$-$C_{12}$ alkyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbonoxy, $C_1$-$C_{12}$ halohydrocarbonoxy wherein at least two carbon atoms separate the halogen and oxygen atoms, or the like. Preferably, each $Z^1$ is $C_{1-4}$ alkyl, and each $Z^2$ is hydrogen or methyl.

There is no particular limitation on the molecular weight or intrinsic viscosity of the functionalized poly(arylene ether). In one embodiment, the composition may comprise a functionalized poly(arylene ether) having a number average molecular weight up to about 10,000 atomic mass units (AMU), preferably up to about 5,000 AMU, more preferably up to about 3,000 AMU. Such a functionalized poly(arylene ether) may be useful in preparing and processing the composition by reducing its viscosity. In another embodiment, the composition may comprise a functionalized poly(arylene ether) having an intrinsic viscosity of about 0.15 to about 0.30 deciliters per gram (dl/g), preferably about 0.20 to about 0.30 dl/g, as measured in chloroform at 25° C. Generally, the intrinsic viscosity of a functionalized poly(arylene ether) will vary insignificantly from the intrinsic viscosity of the corresponding unfunctionalized poly(arylene ether). Specifically, the intrinsic viscosity of a functionalized poly(arylene ether) will generally be within 10% of that of the unfunctionalized poly(arylene ether). These intrinsic viscosities may correspond approximately to number average molecular weights of about 5,000 to about 25,000 AMU. Within this range, a number average molecular weight of at least about 8,000 AMU may be preferred, and a number average molecular weight of at least about 10,000 AMU may be more preferred. Also within this range, a number average molecular weight up to about 20,000 AMU may be preferred. Such a functionalized poly(arylene ether) may provide the composition with a desirable balance of toughness and processability. It is expressly contemplated to employ blends of at least two functionalized poly(arylene ether)s having different molecular weights and intrinsic viscosities.

In a preferred embodiment, the functionalized poly(arylene ether) is substantially free of amino substituents, including alkylamino and dialkylamino substituents, wherein substantially free means that the functionalized poly(arylene ether) contains less than about 300 micrograms, preferably less than about 100 micrograms, of atomic nitrogen per gram of functionalized poly(arylene ether). Although many poly(arylene ether)s are synthesized by processes that result in the incorporation of amino substituents, the present inventors have found that thermoset curing rates are increased when the functionalized poly(arylene ether) is substantially free of amino substituents. Poly(arylene ether)s substantially free of amino substituents may be synthesized directly or generated by heating amino-substituted poly(arylene ether)s to at least about 200° C. Alternatively, if the functionalized poly(arylene ether) contains amino substituents, it may be desirable to cure the composition at a temperature less than about 200° C.

The composition may comprise a blend of at least two functionalized poly(arylene ethers). Such blends may be prepared from individually prepared and isolated functionalized poly(arylene ethers). Alternatively, such blends may be prepared by reacting a single poly(arylene ether) with at least two functionalizing agents. For example, a poly(arylene ether) may be reacted with two capping agents, or a poly(arylene ether) may be metalized and reacted with two unsaturated alkylating agents. In another alternative, a mixture of at least two poly(arylene ether) resins may be reacted with a single functionalizing agent.

The composition may comprise the functionalized poly(arylene ether) in an amount of about 1 part by weight to about 70 parts by weight per 100 parts by weight total of the functionalized poly(arylene ether), the alkenyl aromatic monomer, and the acryloyl monomer. Within this range, it may be preferred to use a functionalized poly(arylene ether) amount of at least about 10 parts by weight, more preferably at least about 15 parts by weight. Also within this range, it may be preferred to use a functionalized poly(arylene ether) amount of up to about 50 parts by weight, more preferably up to about 40 parts by weight.

The composition further comprises an alkenyl aromatic monomer. The alkenyl aromatic monomer may have the structure

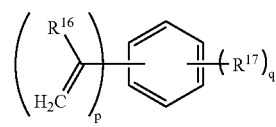

wherein each $R^{16}$ is independently hydrogen, $C_1$-$C_{12}$ alkyl, $C_2$-$C_{12}$ alkenyl, $C_2$-$C_{12}$ alkynyl, $C_6$-$C_{18}$ aryl, or the like; each $R^{17}$ is independently halogen, $C_1$-$C_{12}$ alkyl, $C_1$-$C_{12}$ alkoxyl, $C_6$-$C_{18}$ aryl, or the like; p is 1 to 4; and q is 0 to 5. When p=1, the alkenyl aromatic monomer is termed a monofunctional alkenyl aromatic monomer; when p=2-4, the alkenyl aromatic monomer is termed a polyfunctional alkenyl aromatic monomer. Suitable alkenyl aromatic monomers include styrene, alpha-methylstyrene, alpha-ethylstyrene, alpha-isopropylstyrene, alpha-tertiary-butylstyrene, alpha-phenylstyrene, and the like; halogenated styrenes such as chlorostyrene, dichlorostyrene, trichlorostyrene, bromostyrene, dibromostyrene, tribromostyrene, fluorostyrene, difluorostyrene, trifluorostyrene, tetrafluorostyrene, pentafluorostyrene, and the like; halogenated alkylstyrenes such as chloromethylstyrene, and the like; alkoxystyrenes such as methoxystyrene, ethoxystyrene, and the like; polyfunctional alkenyl aromatic monomers such as 1,2-divinylbenzene, 1,3-divinylbenzene, 1,4-divinylbenzene, trivinylbenzenes, 1,3-diisopropenylbenzene, 1,4-diisopropenylbenzene, and the like; and mixtures comprising at least one of the foregoing alkenyl aromatic monomers. In the foregoing substituted styrenes for which no substituent position is specified, the substituents may occupy any free position on the aromatic ring.

Preferred alkenyl aromatic monomers include styrene, alpha-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, and the like, and mixtures comprising at least one of the foregoing alkenyl aromatic monomers. Preferred alkenyl aromatic monomers further include styrenes having from 1 to 5 halogen substituents on the aromatic ring, and mixtures comprising at least one such halogenated styrene.

The composition may comprise the alkenyl aromatic monomer in an amount of about 30 to about 98 parts by weight per 100 parts by weight total of the functionalized poly(arylene ether), the alkenyl aromatic monomer, and the acryloyl monomer. Within this range, it may be preferred to use an alkenyl aromatic monomer amount of at least about 40 parts by weight, more preferably at least about 50 parts by weight. Also within this range, it may be preferred to use an alkenyl aromatic monomer amount of up to about 90 parts by weight, more preferably up to about 80 parts by weight, yet more preferably up to about 70 parts by weight.

The composition further comprises an acryloyl monomer. The acryloyl monomer comprises at least one acryloyl moiety having the structure

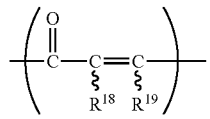

wherein $R^{18}$ and $R^{19}$ are each independently hydrogen, $C_1$-$C_{12}$ alkyl, or the like; and wherein $R^{18}$ and $R^{19}$ may be disposed either cis or trans about the carbon-carbon double bond. Preferably, $R^{18}$ and $R^{19}$ are each independently hydrogen or methyl. In one embodiment, the acryloyl monomer comprises at least two acryloyl moieties having the above structure and is termed a polyfunctional acryloyl monomer. In another embodiment, the acryloyl monomer comprises at least three acryloyl moieties having the above structure.

In one embodiment, the acryloyl monomer comprises at least one acryloyl moiety having the structure

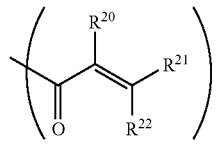

wherein $R^{20}$-$R^{22}$ are each independently hydrogen, $C_1$-$C_{12}$ alkyl, $C_2$-$C_{12}$ alkenyl, $C_6$-$C_{18}$ aryl, $C_7$-$C_{18}$ alkyl-substituted aryl, $C_7$-$C_{18}$ aryl-substituted alkyl, $C_2$-$C_{12}$ alkoxycarbonyl, $C_7$-$C_{18}$ aryloxycarbonyl, $C_8$-$C_{18}$ alkyl-substituted aryloxycarbonyl, $C_8$-$C_{18}$ aryl-substituted alkoxycarbonyl, nitrile, formyl, carboxylate, imidate, thiocarboxylate, or the like. Preferably, $R^{20}$-$R^{22}$ are each independently hydrogen or methyl. In one embodiment, the acryloyl monomer comprises at least two acryloyl moieties having the structure above. In another embodiment, the acryloyl monomer comprises at least three acryloyl moieties having the structure above.

Suitable acryloyl monomers include, for example, methyl (meth)acrylate, ethyl(meth)acrylate, isopropyl(meth)acrylate, n-butyl(meth)acrylate, isobutyl(meth)acrylate, 2-ethylhexyl(meth)acrylate, 2-hydroxyethyl(meth)acrylate, 3-hydroxypropyl(meth)acrylate, hydroxybutyl(meth)acrylate, glycidyl(meth)acrylate, 2,2-dimethyl-3-hydroxypropyl-2,2-dimethyl-3-hydroxypropenoate, isobornyl (meth)acrylate, tetrahydrofurfuryl(meth)acrylate, 3,4-epoxycyclohexylmethyl (meth)acrylate, and the like; halogenated (meth)acrylates such as pentabromobenzyl (meth)acrylate, and the like; and acrylic or methacrylic amides such (meth)acrylamide, diacetone (meth)acrylamide, N(2-hydroxyethyl) (meth) acrylamide, N-methyl(meth)acrylamide, N-ethyl(meth) acrylamide, N,N-dimethyl(meth)acrylamide, N,N-dimethylaminopropyl(meth)acrylamide, N,N-dimethylaminopropyl (meth)acrylamide, N,N-dimethylaminoethyl(meth) acrylamide, and the like; and mixtures comprising at least one of the foregoing acryloyl monomers. It will be understood that the suffix (meth)acryl- denotes either acryl- or methacryl-.

Suitable acryloyl monomers may further include vinyl functionalized anhydrides such as maleic anhydride; and epoxy acrylates, such as the Epoxy Acrylate sold by Sartomer Company under the trade names CN 120 AC16 and CN 118, Epoxidized Soy Bean Oil Acrylate CN 111, Epoxy Acrylate CN 104, Epoxy Acrylate CN 120, Low Viscosity Epoxy Acrylate CN 121, Epoxy Acrylate CN 124, Modified Epoxy Acrylate CN 136, Modified Epoxy Acrylate CN 115, Modified Epoxy Acrylate CN 116, Modified Epoxy Acrylate CN 117, Modified Epoxy Acrylate CN 119, Amine Modified Epoxy Acrylate CN 2100, Fatty Acid Modified Epoxy Acrylate CN 2101, Epoxy Acrylate CN 104 B80, Epoxy Acrylate CN 120 B60, Epoxy Acrylate CN 120 B80, Epoxy Acrylate CN 120 M50, Epoxy Acrylate CN 104 A80, Epoxy Acrylate CN 120 A60, Epoxy Acrylate CN 120 A75, Epoxy Acrylate CN 120 C60, Epoxy Acrylate CN 120 C80, Epoxy Acrylate CN 120 E50, Epoxy Acrylate CN 120 D80, Epoxy Acrylate with Styrene CN 120 S80, Epoxy Novolac Acrylate CN 112 C60, Epoxy Methacrylate CN 151, and the like.

Suitable acryloyl monomers may further include (meth) acrylic acid, crotonic acid, itaconic acid, maleic acid, fumaric acid, and the like; monoesters between a polyether polyol (e.g., polyethylene glycol, polypropylene glycol or polybutylene glycol) and an unsaturated carboxylic acid (e.g., (meth)acrylic acid); monoethers between a polyether polyol (e.g., polyethylene glycol, polypropylene glycol or polybutylene glycol) and a hydroxyl group-containing unsaturated monomer (e.g., 2-hydroxyethyl(meth)acrylate); adducts between an alpha,beta-unsaturated carboxylic acid and a monoepoxy compound (e.g., CARDURA® E10 from Shell Japan Ltd.) or an alpha-olefin epoxide; adducts between glycidyl(meth)acrylate and a monobasic acid (e.g., acetic acid, propionic acid, p-t-butylbenzoic acid, or a fatty acid); monoesters or diesters between an acid anhydride group-containing unsaturated compound (e.g., maleic anhydride or itaconic anhydride) and a glycol (e.g., ethylene glycol, 1,6-hexanediol or neopentyl glycol); hydroxyalkyl vinyl ethers such as hydroxyethyl vinyl ether, and the like; chlorine- and hydroxyl group-containing monomers such as 3-chloro-2-hydroxypropyl(meth)acrylate, and the like; $C_{2-18}$ alkoxyalkyl esters of (meth)acrylic acid, such as methoxybutyl(meth)acrylate, ethoxybutyl(meth)acrylate, and the like; hydrocarbon ring-containing acrylate monomers such as phenyl(meth)acrylate, phenylethyl(meth)acrylate, phenylpropyl (meth)acrylate, benzyl(meth)acrylate, phenoxyethyl(meth)acrylate, cyclohexyl (meth)acrylate, 2-acryloyloxyethyl hydrogenphthalate, 2-acryloyloxypropyl hydrogenphthalate, 2-acryloyloxypropyl hexahydrogenphthalate, 2-acryloyloxypropyl tetrahydrogenphthalate, an ester between p-t-butylbenzoic acid and hydroxyethyl (meth)acrylate, dicyclopentenyl(meth)acrylate, and the like; and mixtures comprising at least one of the foregoing acryloyl monomers.

Other suitable acryloyl monomers include, for example, alkoxylated nonyl phenol acrylate, alkoxylated tetrahydrofurfuryl acrylate, allyl methacrylate, caprolactone acrylate, 2-(2-ethoxyethoxy)ethyl acrylate, (ethoxylated)2 hydroxyethyl methacrylate, (ethoxylated)5 hydroxyethyl methacrylate, (ethoxylated)10 hydroxyethyl methacrylate, (ethoxylated)4 nonyl phenol acrylate, (ethoxylated)4 nonyl phenol methacrylate, glycidyl methacrylate, isobornyl acrylate, isobornyl methacrylate, isodecyl acrylate, isodecyl methacrylate, isooctyl acrylate, lauryl acrylate, lauryl methacrylate, methoxy polyethylene glycol (number average molecular weight, $M_n$, of PEG portion=350 g/mol) monomethacrylate, methoxy polyethylene glycol ($M_n$ of PEG portion=550 g/mol) monomethacrylate, 2-phenoxyethyl acrylate, 2-phenoxyethyl methacrylate, polypropylene glycol monomethacrylate, propoxylated 2-allyl methacrylate, stearyl acrylate, stearyl methacrylate, tetrahydrofurfuryl acrylate, tetrahydrofurfuryl methacrylate, tridecyl acrylate, tridecyl methacrylate, and the like; and mixtures comprising at least one of the foregoing acryloyl monomers.

Suitable acryloyl monomers may further include, for example, unsaturated polyester resins that are the polycondensation reaction product of one or more dihydric alcohols and one or more ethylenically unsaturated polycarboxylic acids. By polycarboxylic acid is meant polycarboxylic or dicarboxylic acids or anhydrides, polycarboxylic or dicarboxylic acid halides, and polycarboxylic or dicarboxylic esters. For example, suitable unsaturated polycarboxylic acids, and the corresponding anhydrides and the acid halides that contain polymerizable carbon-to-carbon double bonds, may include maleic anhydride, maleic acid, and fumaric acid. A minor proportion of the unsaturated acid, up to about forty mole percent, may be replaced by dicarboxylic or polycarboxylic acid that does not contain a polymerizable carbon-to-carbon bond. Examples thereof include the acids (and corresponding anhydrides and acid halides): orthophthalic, isophthalic, terephthalic, succinic, adipic, sebasic, methylsuccinic, and the like. Dihydric alcohols that are useful in preparing the polyesters include, for example, 1,2-propane diol (hereinafter referred to as propylene glycol), dipropylene glycol, diethylene glycol, 1,3-butanediol, ethylene glycol, glycerol, and the like. Examples of suitable unsaturated polyesters are the polycondensation products of (1) propylene glycol and maleic and/or fumaric acids; (2) 1,3-butanediol and maleic and/or fumaric acids; (3) combinations of ethylene and propylene glycols (approximately 50 mole percent or less of ethylene glycol) and maleic and/or fumaric acids; (4) propylene glycol, maleic and/or fumaric acids and dicyclopentadiene reacted with water; and the like; and mixtures comprising at least one of the foregoing acryloyl monomers. In addition to the above described polyesters, dicyclopentadiene modified unsaturated polyester resins such as those described in U.S. Pat. No. 3,883,612 to Pratt et al. may be used. The molecular weight of the polymerizable unsaturated polyester may vary over a considerable range, but ordinarily useful polyesters have a number average molecular weight of about 300 AMU to about 5,000 AMU, and more preferably about 500 AMU to about 5,000 AMU.

In a preferred embodiment, the acryloyl monomer may include compounds having greater than one acrylate moiety per molecule. Illustrative examples include compounds produced by condensation of an acrylic or methacrylic acid with a di-epoxide, such as bisphenol-A diglycidyl ether, butanediol diglycidyl ether, or neopenylene glycol dimethacrylate. Specific examples include 1,4-butanediol diglycidylether di(meth)acrylate, bisphenol A diglycidylether dimethacrylate, and neopentylglycol diglycidylether di(meth)acrylate, and the like. Also included as acryloyl monomers are the condensation of reactive acrylate or methacrylate compounds with alcohols or amines to produce the resulting polyfunctional acrylates or polyfunctional acrylamides. Examples include N,N-bis(2-hydroxyethyl)(meth)acrylamide, methylenebis((meth)acrylamide), 1,6-hexamethylenebis((meth)acrylamide), diethylenetriamine tris((meth)acrylamide), bis(gamma-((meth)acrylamide)propoxy) ethane, beta-((meth)acrylamide) ethylacrylate, ethylene glycol di((meth)acrylate)), diethylene glycol di(meth)acrylate, tetraethylene glycol di(meth)acrylateglycerol di(meth)acrylate, glycerol tri(meth)acrylate, 1,3-propylene glycol di(meth)acrylate, dipropyleneglycol di(meth)acrylate, 1,4-butanediol di(meth)acrylate, 1,2,4-butanetriol tri(meth)acrylate, 1,6-hexanedioldi(meth)acrylate, 1,4-cyclohexanediol di(meth)acrylate, 1,4-benzenediol di(meth)acrylate, pentaerythritoltetra(meth)acrylate, 1,5-pentanediol di(meth)acrylate, trimethylolpropane di(meth)acrylate, trimethylolpropane tri(meth)acrylate), 1,3,5-triacryloylhexahydro-1,3,5-triazine, 2,2-bis(4-(2-(meth)acryloxyethoxy)phenyl) propane, 2,2-bis(4-(2-(meth)acryloxyethoxy)-3,5-dibromophenyl)propane, 2,2-bis((4-(meth)acryloxy)phenyl) propane, 2,2-bis((4-(meth)acryloxy)-3,5-dibromophenyl) propane, and the like, and mixtures comprising at least one of the foregoing acryloyl monomers.

In addition to the acryloyl monomers described above, the acryloyl monomers may include alkoxylated difunctional monomers, such as alkoxylated diacrylate (sold as CD 802 by Sartomer Co.), alkoxylated aliphatic diacrylate, alkoxylated cyclohexane dimethanol diacrylate, alkoxylated cyclohexane dimethanol diacrylate, alkoxylated cyclohexane dimethanol diacrylate, alkoxylated hexane diol diacrylate, alkoxylated hexane diol diacrylate, alkoxylated hexane diol diacrylate, 1,4-butanediol diacrylate, 1,4-butanediol dimethacrylate, 1,3-butylene glycol diacrylate, 1,3-butylene glycol dimethacrylate, cyclohexane dimethanol diacrylate, cyclohexane dimethanol dimethacrylate, diethylene glycol diacrylate, diethylene glycol dimethacrylate, dipropylene glycol diacrylate, (ethoxylated)3 bisphenol A diacrylate (it will be understood that the number following the ethoxylated term refers to the average number of ethoxy groups in the ethoxylate chains attached to each oxygen of bisphenol A), (ethoxylated)4 bisphenol A diacrylate, (ethoxylated)10 bisphenol A diacrylate, (ethoxylated)30 bisphenol A diacrylate, (ethoxylated)2 bisphenol A dimethacrylate, (ethoxylated)4 bisphenol A dimethacrylate, (ethoxylated)6 bisphenol A diacrylate, (ethoxylated)8 bisphenol A diacrylate, (ethoxylated)10 bisphenol A dimethacrylate, (ethoxylated) 30 bisphenol A dimethacrylate, ethylene glycol dimethacrylate, 1,6-hexanediol di(meth)acrylate, neopentyl glycol di(meth)acrylate, polyethylene glycol ($M_n$=200-600) di(meth)acrylate, tetraethylene glycol di(meth)acrylate, triethylene glycol di(meth)acrylate, tripropylene glycol di(meth)acrylate, and the like; alkoxylated trifunctional monomers such as highly (propoxylated)5.5 glyceryl tri (meth)acrylate, (ethoxylated)3 trimethylolpropane tri(meth) acrylate, (ethoxylated)6 trimethylolpropane tri(meth)acrylate, (ethoxylated)15 trimethylolpropane tri(meth)acrylate, (ethoxylated)9 trimethylolpropane tri(meth)acrylate, (ethoxylated)20 trimethylolpropane tri(meth)acrylate, pentaerythritol tri(meth)acrylate, (propoxylated)3 glyceryl tri (meth)acrylate, (propoxylated)3 trimethylolpropane tri (meth)acrylate, (propoxylated)6 trimethylolpropane tri (meth)acrylate, tris (2-hydroxyethyl)isocyanurate tri(meth) acrylate solid, tris(2-hydroxyethyl) isocyanurate tri(meth) acrylate liquid, and the like; and tetrafunctional and pentafunctional monomers such as dipentaerythritol penta (meth)acrylate, di-(trimethylolpropane)tetra(meth)acrylate, (ethoxylated)4 pentaerythritol tetra(meth)acrylate, dipentaerythritol penta(meth)acrylate ester, pentaerythritol tetra (meth)acrylate, and the like; and mixtures comprising at least one of the foregoing acryloyl monomers.

Suitable acryloyl monomers may further include trifunctional urethane (meth)acrylates, such as the trifunctional urethane (meth)acrylates sold by Sartomer Company under the product names CN 929, CN 945 A60, CN 945 B85, CN 959, CN 962, CN 964, CN 965, CN 968, CN 980, CN 981, CN 983, CN 984, CN 944 B85, CN 953 B70, CN 963 B80, CN 964B85, CN 966 B85, CN 981 B88, CN 982 B88, CN 983 B88, CN 985 B88, CN 961H81, CN 966H90, CN 982 P90, CN 963 A80, CN 964 A85, CN 965 A80, CN 966 A80, CN 981 A75, CN 982 A75, CN 980 M50, CN 961 E75, CN 963 E75, CN 963 E80, CN 964 E75, CN 982 E75, CN 963 J85, CN 966 J75, CN 966 I80, CN 966 R60, and CN 964H90; hexafunctional urethane (meth)acrylates, such as the hexafunctional urethane (meth)acrylates sold by Sartomer Company under the product name CN 975; and urethane (meth)acrylates such as the urethane (meth)acrylates sold by Sartomer Company under the product names CN 972, CN 2901, CN 2902, CN 978, CN 999, CN 970H75, CN 973H85, CN 970 A60, CN 971 A80, CN 973 A80, CN 977 C70, CN 970 E60, CN 973 J75, and CN 1963; and the like; and mixtures comprising at least one of the foregoing acryloyl monomers.

Suitable acryloyl monomer may further include low viscosity oligomers, such as the low viscosity oligomers sold by Sartomer Company under the product numbers CN 130, CN 131, CN 135, and CN 137; polyester acrylate oligomers, such as the polyester acrylate oligomers sold by Sartomer Company under the product names Polyester Acrylate CN 293, CN 292, and CN 2200, and Chlorinated Polyester Acrylate CN 2201; adhesion promoting oligomers, such as the adhesion promoting oligomers sold by Sartomer Company under the product number CN 704; polybutadiene dimethacrylates, such as the polybutadiene dimethacrylates sold by Sartomer Company under the product numbers CN 301 and CN 303; Polybutadiene Urethane Diacrylate CN 302, and Polybutadiene Dimethacrylate CN 303; specialty oligomers, such as the specialty oligomers sold by Sartomer Company under the tradename SARBOX® as, for example, Aromatic Acid Methacrylate Half Ester in EEP Ester Solvent SB 401, SB 404, and SB 405, Aromatic Acid Methacrylate Half Ester in PM, Alcohol/EEP Ester Solvent SB 402, Aromatic Acid Methacrylate Half Ester in PM, Alcohol Solvent SB 400, Aromatic Acid Acrylate Half Ester in SR 339 SB 520 M35, Aromatic Acid Acrylate Half Ester in SR454 SB 520 E35, Aromatic Acid Methacrylate Half Ester in SR306 SB 520 A20, Aromatic Acid Methacrylate Half Ester in SR344 SB 500 K60, Aromatic Acid Methacrylate Half Ester in SR454 SB 500 E50, and Aromatic Acid Methacrylate Half Ester in SR454 SB 510 E35; acrylates, including, Low Viscosity Triacrylate Oligomer CN 132, Low Viscosity Triacrylate Oligomer CN 133, Low Viscosity Monoacrylate Oligomer CN 152, Urethane Acrylate CN 959, Polyester Acrylate CN 293, Urethane Acrylate CN 968, Urethane Acrylate CN 2901,Urethane Acrylate CN 2902, Urethane Acrylate CN 999, Low Viscosity Aliphatic Monoacrylate CN 135, Low Viscosity Aliphatic Monoacrylate CN 137, Amine Modified Epoxy Acrylate CN 2100, Fatty Acid Modified Epoxy Acylate CN 2101, Polyester Acrylate CN 2200, Chlorinated Polyester Acrylate CN 2201, Acrylated Acrylic CN 2800, Epoxy Acrylate CN 120 AC16, Polybutadiene Urethane Diacrylate CN 302, Polybutadiene Dimethacrylate CN 303, (Meth)Acrylate Functional Monomer P-Cure 300, and (Meth)Acrylate Functional Monomer P-Cure 301; functional acrylic oligomers, such as the functional acrylic oligomers sold by Sartomer Company under the tradename SARCRYL® as SARCRYL® Functional AcrylicSarcryl CN816, SARCRYL® Functional AcrylicSarcryl CN817, SARCRYL® Functional AcrylicSarcryl CN818, Amine Modified Polyether Acrylate CN 501, Amine Modified Polyether Acrylate CN 502, Amine Modified Polyether Acrylate CN 550, Amine Modified Polyether Acrylate CN 551, Alkoxylated Trifunctional Acrylate Ester such as SR 9008 sold by Sartomer Co., Metallic Diacrylate SR 9016, and metallic diacrylates such as zinc diacrylate, lithium diacrylate, sodium diacrylate, magnesium diacrylate, calcium diacrylate, aluminum diacrylate, Monofunctional Acid Ester CD 9050, Trifunctional Acid Ester CD 9051 and CD 9052, Trifunctional Acrylate Ester SR 9012, and Trifunctional Methacrylate Ester SR 9009 and SR 9011; and the like; and mixtures comprising at least one of the foregoing acryloyl monomers.

Highly preferred acryloyl monomers include trimethylolpropane tri(meth)acrylate, 1,6-hexanediol di(meth)acrylate, ethylene glycol di(meth)acrylate, propylene glycol di(meth) acrylate, cyclohexanedimethanol di(meth)acrylate, butanedioldi(meth)acrylate, diethylene glycol di(meth)acrylate, triethylene glycol di(meth)acrylate, isobornyl(meth)acrylate, cyclohexyl(meth)acrylate, butyl(meth)acrylate, methyl (meth)acrylate, dibutyl fumarate, dibutyl maleate, glycidyl (meth)acrylate, ethyl(meth)acrylate, 2-ethylhexyl(meth) acrylate, hexyl (meth)acrylate, lauryl(meth)acrylate, stearyl (meth)acrylate, decyl(meth)acrylate, octyl(meth)acrylate, and the like, and mixtures comprising at least one of the foregoing acryloyl monomers.

In one embodiment, the acryloyl monomer comprises an acryloyl monomer having a number average molecular weight less than about 1,000 AMU and an acryloyl monomer having a number average molecular weight greater than about 2,500 AMU; more preferably the acryloyl monomer comprises an acryloyl monomer having a number average molecular weight less than about 500 AMU and an acryloyl monomer having a number average molecular weight greater than about 3,000 AMU.

The composition may comprise the acryloyl monomer in an amount of about 15 to about 69 parts by weight per 100 parts by weight total of the functionalized poly(arylene ether), the alkenyl aromatic monomer, and the acryloyl monomer. Within this range, it may be preferred to use an acryloyl monomer amount of at least about 5 parts by weight, more preferably at least about 15 parts by weight. Also within this range, it may be preferred to use an acryloyl monomer amount of up to about 60 parts by weight, more preferably up to about 40 parts by weight, yet more preferably up to 30 parts by weight.

The composition further comprises an electrically conductive agent, hereinafter referred to as a conductive agent. Suitable conductive agents include graphite, conductive carbon black, conductive carbon fibers, metal fibers, metal particles, particles of intrinsically conductive polymers, and the like. Suitable conductive carbon fibers include those having a length of about 0.25 inch and a diameter of about 7 micrometers. Suitable conductive carbon fibers also include agglomerates of fibers having an aspect ratio of at least 5 and an average diameter of about 3.5 to about 500 nanometers as described, for example, in U.S. Pat. Nos.

4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; U.S. Pat. No. 5,589,152 to Tennent et al.; and U.S. Pat. No. 5,591,382 to Nahass et al. Suitable graphite particles may have an average particle size of about 20 to about 1,000 nanometers and a surface area of about 1 to about 100 $m^2/g$. Examples of suitable carbon blacks include particles of carbon having an average primary particle diameter of less than about 125 nanometers, more preferably less than about 60 nanometers. The carbon black is preferably utilized as an aggregate or agglomerate of primary particles, the aggregate or agglomerate typically having a size about 5 to about 10 times the primary particle size. Larger agglomerates, beads, or pellets of carbon particles may also be utilized as a starting material in the preparation of the composition, so long as they disperse during the preparation or processing of the composition sufficiently to reach an average size in the cured composition of less than about 10 microns, more preferably less than about 5 microns, and more preferably less than about 1.25 microns. Suitable intrinsically conductive polymers include polyanilines, polypyrroles, polyphenylene, polyacetylenes, and the like.

The amount of the conductive agent will vary according to the identity of the conductive agent and the conductivity requirements of the article comprising the composition. Selection of a conductive agent amount may be made by those of ordinary skill in the art. For example, when the conductive agent is graphite and the composition is used to form a bipolar plate for a fuel cell, the conductive agent may be present in an amount of about 5 weight percent to about 95 weight percent, based on the total weight of the composition. Within this range, it may be preferred to use a graphite amount of at least about 10 weight percent, more preferably at least about 20 weight percent, yet more preferably at least about 30 weight percent. Also within this range, it may be preferred to use a graphite amount of up to about 90 weight percent, more preferably up to about 80 weight percent, yet more preferably up to about 70 weight percent, based on the total weight of the composition. As another example, when the composition is used to form a bipolar plate and the conductive agent is conductive carbon fibers having an aspect ratio of at least 5 and an average diameter of about 3.5 to about 500 nanometers, the carbon fibers may be present in an amount of about 0.1 to about 10 weight percent, based on the total weight of the composition. Within this range, a carbon fiber amount of at least about 1 weight percent may be preferred. Also within this range, a carbon fiber amount up to about 5 weight percent may be preferred.

It is expressly contemplated to provide at least a portion of the conductive agent in the form of the cured, ground composition. For example, an article consisting of the cured composition with 80 weight percent graphite may be recycled by grinding it into a powder and using the powder to provide at least a portion of the graphite in the preparation of a new batch of the curable composition.

The composition may, optionally, further comprise a multivalent metal ion. Suitable multivalent metal ions include those in Groups IIA, IIIA, and IB-VIIIB of the periodic table. Preferred multivalent ions include ions of magnesium, calcium, zinc, and aluminum. The multivalent metal ions may be present, for example, as salts of counterions including halides, hydroxides, oxides and the like. When present, the multivalent metal ion may be used in an amount of about 0.1 to about 5 parts by weight per 100 parts total of the functionalized poly(arylene ether), the alkenyl aromatic monomer, and the acryloyl monomer.

The composition may, optionally, further comprise a curing catalyst to increase the curing rate of the unsaturated components. Curing catalysts, also referred to as initiators, are well known to the art and used to initiate the polymerization, cure or crosslink any of numerous thermoplastics and thermosets including unsaturated polyester, vinyl ester and allylic thermosets. Non-limiting examples of curing catalysts are those described in "Plastic Additives Handbook, $4^{th}$ Edition" R. Gachter and H. Muller (eds.), P. P. Klemchuck (assoc. ed.) Hansen Publishers, New York 1993, and in U.S. Pat. No. 5,407,972 to Smith et al., and U.S. Pat. No. 5,218,030 to Katayose et al. The curing catalyst for the unsaturated portion of the thermoset may include any compound capable of producing radicals at elevated temperatures. Such curing catalysts may include both peroxy and non-peroxy based radical initiators. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl)benzene, 2,5-dimethyl-2,5-di(t-butylperoxy)hexane, dicumylperoxide, di(t-butylperoxy isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, and the like, and mixtures comprising at least one of the foregoing curing catalysts. Typical non-peroxy initiators include, for example, 2,3-dimethyl-2,3-diphenylbutane, 2,3-trimethylsilyloxy-2,3-diphenylbutane, and the like, and mixtures comprising at least one of the foregoing curing catalysts. The curing catalyst for the unsaturated portion of the thermoset may further include any compound capable of initiating anionic polymerization of the unsaturated components. Such anionic polymerization catalysts include, for example, alkali metal amides, such as sodium amide ($NaNH_2$) and lithium diethyl amide ($LiN(C_2H_5)_2$); alkali metal and ammonium salts of $C_1$-$C_{10}$ alkoxides; alkali metal and ammonium hydroxides; alkali metal cyanides; organometallic compounds such as the alkyl lithium compound n-butyl lithium and the grignard reagent phenyl magnesium bromide; and the like; and combinations comprising at least one of the foregoing anionic polymerization catalysts.

In a preferred embodiment, the curing catalyst may be comprise t-butylperoxybenzoate or methyl ethyl ketone peroxide. The curing catalyst may promote curing at a temperature of about 0° C. to about 200° C.

When present, the curing catalyst may be used in an amount of about 0.1 to about 10 parts by weight per 100 parts total of the functionalized poly(arylene ether), the alkenyl aromatic monomer, and the acryloyl monomer. Within this range, it may be preferred to use a curing catalyst amount of at least about 0.5 parts by weight, more preferably at least about 1 part by weight. Also within this range, it may be preferred to use a curing catalyst amount of up to about 5 parts by weight, more preferably up to about 3 parts by weight.

The composition may, optionally, further comprise a curing promoter to decrease the gel time. Suitable curing promoters include transition metal salts and complexes such as cobalt naphthanate; and organic bases such as N,N-dimethylaniline (DMA) and N,N-diethylaniline (DEA). Preferably, cobalt naphthanate and DMA are used in combination. When present, the promoter may be used in an amount of about 0.05 to about 3 parts, per 100 parts total of the functionalized poly(arylene ether), the alkenyl aromatic monomer, and the acryloyl monomer.

When the composition is to be cured using ultraviolet light, it may further comprise a photoinitiator, such as, for example, the photoinitiators described in U.S. Pat. No. 5,407,972, including, for example, ethyl benzoin ether, isopropyl benzoinether, butyl benzoin ether, isobutyl benzoin ether, alpha,alpha-diethoxyacetophenone, alpha,alpha-dimethoxy-alpha-phenylacetophenone, diethoxyphenylacetophenone, 4,4'-dicarboethoxybenzoin ethylether, benzoin phenyl ether, alpha-methylbenzoin ethyl ether alpha-methylolbenzoin methyl ether, trichloroacetophenone, and the like, and mixtures comprising at least one of the foregoing photoinitiators.

The composition may further comprise additives known in the art, including, for example, flame retardants; lubricants including internal and external mold release agents; antioxidants; thermal stabilizers; ultraviolet stabilizers; pigments, dyes, and colorants; anti-static agents; fillers including fibrous fillers and polymeric fillers; blowing agents; rheological modifiers; and the like.

Flame retardants include, for example, brominated flame retardant compounds. Preferred brominated flame retardant compounds include, for example, brominated diphenyl ethers varying in bromination levels from 2-10 bromines per molecule such as, for example, tetrabromodiphenyloxide, pentabromodiphenyloxide, octabromodiphenyloxide, and decabromodiphenyl oxide. Other brominated derivatives include tetradecabromodiphenoxybenzene, tetrabromocyclooctane, 2,4,6-tribromophenylmaleimide, phenyl-1,2,3,4-tetrabromophthalamide, 2,4,6-tribromophenyl-1,2,3,4-tetrabromophthalimide, 1,4-phenylene-bis(1,2,3,4-tetrabromophthalimide), 1,3-phenylene-bis(1,2,3,4-tetrabromophthalimide, hexabromocyclododecane, 4-bromophenyl(1,2,3,4-tetrabromotetrabromophthalamide), pentabromobenzylacrylate, 1,6-bis(1,2,3,4-tetrabromophthalmido)hexane, 1,2-bis(1,2,3,4-tetrabromophthalmido) ethane, dibromoethyl dibromocyclohexane, hexabromocyclododecane, tetrabromobisphenol-A, bis(2,3-dibromopropyl ether), tetrabromophthalic anhydride, Diels Alder adducts of chlorinated cyclopentadienes and diene derivatives such as cyclooctadiene, dechlorane, 1,3,5-tris(2,4,6-tribromophenoxy)triazine, polybrominated diphenyl ethers, poly(2,6-dibromophenylene ether), brominated styrene monomers such as dibromostyrene, brominated polycarbonate, bis(tribromophenoxy)ethane, perbrominated-bibenzyl, dibromoethylcyclohexane, decabromodiphenyl oxide brominated polystyrene, brominated cyclododecane, brominated bisphenol-A diglycidyl ether and oligomers thereof, brominated hydroxyethyl ether. Preferred phosphorus-containing flame retardants include, for example, $C_6$-$C_{100}$ aromatic, $C_6$-$C_{100}$ aliphatic, or $C_6$-$C_{100}$ mixed aromatic-aliphatic phosphate esters such as, for example, triphenyl phosphate, tricresyl phosphate, triethyl phosphate, dimethyl methylphosphonate and aluminum and zinc salts thereof, tris(2-allylphenyl)phosphate, isopropylphenyl diphenylphosphate, tris(2-methoxy-4-allylphenyl)phosphate, tris(2-propenylphenyl)phosphate, tris(4-vinylphenyl) phosphate, bis(diphenylphosphate ester)s of bisphenols including bisphenol-A and resorcinol and hydroquinone, bis(diphenyl phosphoramide)s of diamines such as 1,6-hexanediamine and piperidine, and alkylated or substituted derivatives thereof. Other suitable flame retardants include Melamine, cyclophosphazenes such as hexamino and hexaphenyl cyclophosphazenes and derivatives thereof, aluminum trihydrate, zinc borate, borax, tin oxide, zinc hydroxy stannate, zinc stannate, magnesium hydroxide, and hydromagnesite, huntite, molybdenum trioxide, zinc molybdate, calcium molybdate, ammonium molybdate, ferrous oxides, ferrocene, trischloroethylphosphate, dialkyl vinylphosphonates such as diethylvinylphosphonate, ammonium polyphosphate, melamine phosphonates, urea, red phosphorus, phosphorylated polyvinyl alcohol, and the like. If brominated flame retardants are used, it is preferred that the bromine content of the brominated flame retardant be greater than 45 weight percent, more preferably greater than 60 weight percent, still more preferably greater than 70 weight percent. The high bromine content of the flame retardant allows one to obtain UL-94 flammability and at the same time maintain high poly(arylene ether) content and optimal dielectric properties.

Lubricants may include fatty alcohols and their dicarboxylic acid esters including cetyl, stearyl and tall oil alcohol, distearyl adipate, distearyl phthalate, fatty acid esters of glycerol and other short chain alcohols including glycerol monooleate, glycerol monostearate, glycerol 12-hydroxystearate, glycerol tristearate, trimethylol propane tristearate, pentaerythritol tetrastearate, butyl stearate, isobutyl stearate, stearic acids, 12-hydroxystearic acid, oleic acid amide, erucamide, bis(stearoyl)ethylene diamine, calcium stearate, zinc stearate, neutral lead stearate, dibasic lead stearate, stearic acid complex esters, oleic acid complex esters, calcium soap containing complex esters, fatty alcohol fatty acid esters including isotridecyl stearate, cetyl palmitate, stearyl stearate, behenyl behenate, montanic acid, montanic acid ethylene glycol esters, montanic acid glycerol esters, montanic acid pentaerythritol esters, calcium soap containing montanic acid esters, calcium montanate, sodium montanate; linear or branched polyethylene, partially saponified polyethylene wax, ethylene-vinyl acetate copolymer, crystalline polyethylene wax; natural or synthetic paraffin including fully refined wax, hardened paraffin wax, synthetic paraffin wax, microwax, and liquid paraffin; fluoropolymers including polytetrafluoroethylene wax, and copolymers with vinylidene fluoride.

The composition may further comprise one or more fillers, including low-aspect ratio fillers, fibrous fillers, and polymeric fillers. Examples of such fillers well known to the art include those described in "Plastic Additives Handbook, 4$^{th}$ Edition" R. Gachter and H. Muller (eds.), P. P. Klemchuck (assoc. ed.) Hansen Publishers, New York 1993. Non-limiting examples of fillers include silica powder, such as fused silica and crystalline silica; boron-nitride powder and boron-silicate powders for obtaining cured products having low dielectric constant and low dielectric loss tangent; the above-mentioned powder as well as alumina, and magnesium oxide (or magnesia) for high temperature conductivity; and fillers, such as wollastonite including surface-treated wollastonite, calcium sulfate (as its anhydride, dihydrate or trihydrate), calcium carbonate including chalk, limestone, marble and synthetic, precipitated calcium carbonates, generally in the form of a ground particulate which often comprises 98+% $CaCO_3$ with the remainder being other inorganics such as magnesium carbonate, iron oxide, and alumino-silicates; surface-treated calcium carbonates; talc, including fibrous, modular, needle shaped, and lamellar talc; glass spheres, both hollow and solid, and surface-treated glass spheres typically having coupling agents such as silane coupling agents and/or containing a conductive coating; and kaolin, including hard, soft, calcined kaolin, and kaolin comprising various coatings known to the art to facilitate the dispersion in and compatibility with the thermoset resin; mica, including metallized mica and mica surface treated with aminosilanes or acryloylsilanes coatings to impart good physicals to compounded blends; feldspar and nepheline syenite; silicate spheres; flue dust; cenospheres; fillite; aluminosilicate (armospheres), including silanized and metallized aluminosilicate; natural silica sand; quartz; quartzite; perlite; Tripoli; diatomaceous earth; synthetic silica, including those with various silane coatings, and the like.

The above fillers may be used in metallized or silane coated forms to improve compatibility and adhesion with the thermoset blend.

Other mineral fillers include silicon carbide to increase the abrasive action of polymers; molybdenum sulfide to improve the lubricity, zinc sulfide to impart a white coloration; aluminum silicate (mullite), synthetic calcium silicate and zirconium silicate to improve slip properties; barium titanate to enhance dielectric properties; barium ferrite to produce magnetized polymers; and barium sulfate and heavy spar.

Other fillers include metals and metal oxides including particulate or fibrous aluminum, bronze, zinc, copper and nickel to improve, for example, thermal, electrical conductivity or resistance to neutron or gamma rays. Aluminum hydroxide may be incorporated to improve the flammability of a polymer resin.

Other fillers include flaked fillers and reinforcements such as glass flakes, flaked silicon carbide, aluminum diboride, aluminum flakes, and steel flakes.

Fibrous fillers include short inorganic fibers, including processed mineral fibers such as those derived from blends comprising at least one of aluminum silicates, aluminum oxides, magnesium oxides, and calcium sulfate hemihydrate.

Other fibrous fillers include natural fillers and reinforcements, such as wood flour obtained by pulverizing wood, and fibrous products such as cellulose, cotton, sisal, jute, starch, cork flour, lignin, ground nut shells, corn, rice grain husks.

Other fibrous fillers include synthetic reinforcing fibers, including polyesters such as polyethylene terephthalate, polyvinylalcohol; and high tenacity fibers with high thermal stability, including basalt fibers, carbon fibers, aromatic polyamide fibers, polybenzimidazole, polyimide fibers such as polyimide 2080 and PBZ fiber (both products of Dow Chemical Company, Midland, Mich. USA); and polyphenylene sulfide fiber, polyether ether ketone fibers, boron fibers, ceramic fibers such as silicon carbide, and fibers from mixed oxides of aluminum, boron and silicon sold under the trade name NEXTEL® by 3M Co., St. Paul, Minn., USA.

Also included among fibrous fillers are single crystal fibers or "whiskers" including silicon carbide, alumina, boron carbide, carbon, iron, nickel, copper.

Also included among fibrous fillers are glass fibers, including textile glass fibers such as E, A, C, ECR, R, S, D, and NE glasses and quartz.

When present, the fillers, including fibrous fillers, may be used in an amount of about 0.005 to about 1000 parts, preferably about 1 to about 500 parts, more preferably about 10 to about 250 parts, yet more preferably about 50 to about 200 parts, per 100 parts total of the functionalized poly (arylene ether), the alkenyl aromatic monomer, and the acryloyl monomer.

These aforementioned fillers may be added to the thermosetting resin without any treatment, or after surface treatment, generally with an adhesion promoter.

The formulation may also contain adhesion promoters to improve adhesion of the thermosetting resin to the filler or to an external coating or substrate. Also possible is treatment of the aforementioned inorganic fillers with adhesion promoter to improve adhesion. Adhesion promoters include chromium complexes, silanes, titanates, zirco-aluminates, propylene maleic anhydride copolymers, reactive cellulose esters and the like. Chromium complexes include those sold by DuPont under the tradename VOLAN®. Silanes include molecules having the general structure $(RO)_{(4-n)}SiY_n$ wherein n=1-3, R is an alkyl or aryl group and Y is a reactive functional group which can enable formation of a bond with a polymer molecule. Particularly useful examples of coupling agents are those having the structure $(RO)_3SiY$. Typical examples include vinyl-triethoxysilane, vinyl tris(2-methoxy)silane, g-methacryloxypropyltrimethoxy silane, g-aminopropyltriethoxysilane, g-glycidoxypropyltrimethoxysilane, g-mercaptopropyltrimethoxysilane. Titanates include those developed by S. J. Monte et al. in Ann. Chem. Tech Conf. SPI (1980), Ann. Tech Conf. Reinforced Plastics and Composite inst. SPI 1979, Section 16E, New Orleans; and S. J. Monte, Mod. Plastics Int. 14(1984) 6 pg. 2. Zirco-aluminates include those described by L. B. Cohen in Plastics Engineering 39 (1983) 11, pg. 29. The adhesion promoter may be included in the thermosetting resin itself, or coated onto any of the fillers described above to improve adhesion between the filler and the thermosetting resin. For example such promoters may be used to coat a silicate fiber or filler to improve adhesion of the resin matrix.

Polymeric fillers, including thermoplastics, rubbers, elastomers, and the like, may also be used. Examples of thermoplastics include powdery engineering resins, such as polycarbonate, thermoplastic polyester, polyestercarbonate, polyphenylene ether, polysulfone, polyether sulfone, polystyrene including syndiotactic polystyrene, polyethersulfide, and polyacrylate; powdery polyolefins, such as polyethylene, polypropylene and poly-4-methyl pentene-1; fluoroplastics, such as polytetrafluoroethylene, tetrafluoroethylene-propylene copolymer; chlorinated polyethylene; ethylene vinyl acetate copolymers; polyacrlyates such as polybutyl acrylate, poly(2-hexyl acrylate); core-shell impact modifiers, such as polymethylmethacrylate-polybutylacrylate, poly(acrylonitrile-butadiene-styrene), poly(styrene-acrylonitrile) copolymers, poly(methylmethacrylate-butadiene-styrene) terpolymers; polyphenylene ether; ethylene propylene rubbers including diene modified ethylene propylene rubbers, and butadiene/styrene block copolymers. Polymeric fillers may also include organic fillers such as rubbers, including acrylate-butadiene rubber, copolymers of ethyl acrylate (or other acrylates) and a small amount of a monomer that facilitates vulcanization (acrylic rubber), terpolymer from tetrafluoroethylene, trifluoronitrosomethane, and nitroso-perfluorobutyric acid (nitroso rubber), ethylacrylate-acrylonitrile copolymer (acrylate rubber), alkylene sulfide rubber, urethane rubber based on polyester, butadiene rubber (polybutadiene), bromobutyl rubber, chlorobutyl rubber, polychlorotrifluoroethylene (fluoro rubber), chloropolyethylene, epichlorohydrin homopolymer rubber (polychloromethyloxiran), chloroprene rubber (polychloroprene), chlorosulfonylpolyethylene, ethylene-ethyl acrylate copolymer (e.g., those sold by DuPont under the tradename VAMAC®), copolymer of ethylene oxide (oxiran) and chloromethyloxiran (epichlorohydrin rubber), epoxidized natural rubber, ethylene-propylene-diene terpolymer, ethylene-propylene copolymer, urethane rubber based on polyether, epichlorohydrin-ethyleneoxide terpolymer, ethylene-vinylacetate copolymer, methyl silicone rubber with fluoro groups, rubber having fluoro or fluoroalkyl or fluoroalkoxy substituent groups on the polymer chain, copolymer from propylene oxide and allyl glycidyl ether, hydrogenated nitrile rubber, isobutylene-isoprene rubber (butyl rubber), polyisobutene, synthetic isoprene rubber, liquid silicone rubber, methyl silicone rubber, and acrylonitrile-butadiene rubber. Polymeric fillers further include functionalized polybutadiene and polybutadiene-acrylonitrile rubbers including those sold under the tradename HYCAR® by B.F. Goodrich Company, including, carboxy functionalized polybutadiene rubbers such as HYCAR® 2000X162CTB (Carboxyl Equivalents=0.045; Mn=4,200; Carboxyl Equivalents per chain 1.9); HYCAR® CS 8596 (Carboxyl equivalents=0.032; Mn=6250; Carboxyl equivalents/chain=approx. 2), and carboxy terminated poly(butadiene-co-acrylonitrile) rubbers such as HYCAR® 1300X31CTBN (Acrylonitrile content=10%; Carboxyl Equivalents=0.050; Mn=3,800; Carboxyl equivalents/chain=1.9); HYCAR® 1300X8 CTBN(Acrylonitrile content=18%; Carboxyl Equivalents=0.052; Mn=3,550; Carboxyl equivalents/chain=1.8) HYCAR® 1300X13 CTBN (Acrylonitrile content=26%; Carboxyl Equivalents=0.057; Mn=3,150; Carboxyl equivalents/chain=1.8); HYCAR® 1300X9CTBNX (Acrylonitrile content=18; Carboxyl Equivalents=0.067; Mn=3,600; Carboxyl equivalents/chain=2.4); HYCAR® 1300X18 CTBNX (Acrylonitrile content=21.5; Carboxyl Equivalents=0.070; Mn=3,400; Carboxyl equivalents/chain=2.4), vinyl and carboxy functionalized poly(butadiene-acrylonitrile) rubbers including HYCAR® 1300X33 VTBNX (Acrylonitrile content=18%; Carboxyl Equivalents per 100 rubber=0.009 maximum); HYCAR® 1300X43 VTBNX (Acrylonitrile content=21.5%; Carboxyl Equivalents per 100 rubber=0.009 maximum); epoxy terminated poly(butadiene-acrylonitrile) rubber HYCAR® 1300X40 ETBN (Carboxyl Equivalents per chain=0.027 maximum; 50% solution in styrene); amine terminated polybutadiene-acrylonitrile rubbers such as HYCAR® 1300X21ATBN (Acrylonitrile content=10%), 1300X16ATBN (Acrylonitrile content=18%); HYCAR® 1300X45 ATBN (Acrylonitrile content=18%); 1300X35ATBN (Acrylonitrile content=26%); HYCAR® 1300X42 ATBN (Acrylonitrile content=18%); also included are the functionalized polybutadienes and poly(butadiene-styrene) random copolymers sold by Ricon Resins, Inc. under the trade name RICON®, RICACRYL®, and RICOBOND® resins these include butadienes containing both low vinyl content such as RICON® 130, 131, 134, 142 polybutadienes containing high vinyl content such as RICON® 150, 152, 153, 154, 156, 157, and P30D; also random copolymers of styrene and butadiene including RICON® 100, 181, 184, and maleic anhydride grafted polybutadienes and the alcohol condensates derived therefrom such as RICON® 130MA8, RICON® MA13, RICON® 130MA20, RICON® 131MAS, RICON® 131MA10, RICON® MA17, RICON® MA20, RICON®184MA6 and RICON® 156MA17; also include are polybutadienes which may be used to improve adhesion including RICOBOND® 1031, RICOBOND® 1731, RICOBOND® 2031, RICACRYL® 3500, RICOBOND® 1756, RICACRYL® 3500; also are included the polybutadienes RICON® 104 (25% polybutadiene in heptane), RICON® 257 (35% polybutadiene in styrene), and RICON® 257 (35% polybutadiene in styrene); also are included (meth) acrylic functionalized RICACRYL® 3100, RICACRYL® 3500, and RICACRYL® 3801. Also are included are powder dispersions of functional polybutadiene derivatives including, for example, RICON® 150D, 152D, 153D, 154D, P30D, RICOBOND® 1731HS, and RICOBOND® 1756HS.

Polymeric fillers further include acrylonitrile-chloroprene rubber, acrylonitrile-isoprene rubber, isoprene rubber, polyglycol ether, vinylpyridine-butadiene rubber, polyethylene, and methyl silicone rubber with phenyl groups. Polymeric fillers may also include polyfluoralkoxyphosphazene, polynorbornene, propyleneoxide rubber, polypropylene, vinylpyridine-styrene-butadiene rubber, urethane rubbers, methyl silicone rubber with phenyl and vinyl groups, styrene-butadiene rubber, styrene-butadiene-styrene block copolymer (thermoplastic elastomer), styrene-chloroprene rubber, polysiloxane treated EPDM, styrene-isoprene rubber, styrene-isoprene-styrene block copolymer (thermoplastic elastomer), polythioglycol ether, tetrafluoroethylene, polysulfide rubbers, trans-polyoctenamer, trans-polypentenamer, thermoplastic elastomers, thermoplastic polyolefins, thermoplastic polyurethanes, methyl silicone rubber with vinyl groups, crosslinkable polyethylene, emulsion polymer, solution polymer, oil-extended rubber, poly(vinylchloride-co-vinyl acetate-co acrylic acid), poly(ethylene-co-vinylacetate-co-acrylic acid).

Also included among polymeric fillers are electrically conductive polymers such as polypyrrole, polyaniline, polyphenylene, polyacetylene, and substituted derivatives there of, including derivatives substituted with $C_1$-$C_{25}$ alkyl, $C_1$-$C_{25}$ alkoxy, $C_2$-$C_{25}$ alkylcarbonyl, $C_2$-$C_{25}$ alkylcarbonyloxy, $C_6$-$C_{25}$ aryl, $C_6$-$C_{25}$ aryloxy, $C_7$-$C_{25}$ arylcarbonyl, and $C_7$-$C_{25}$ arylcarbonyloxy.

When present, the polymeric fillers may be used in amounts of about 0.005 to about 200 parts, preferably about 2 to about 30 parts, more preferably about 5 to about 25 parts, yet more preferably about 10 to about 20 parts, per 100 parts total of the functionalized poly(arylene ether), the alkenyl aromatic monomer, and the acryloyl monomer.

Additives may also include blowing agents such as azo compounds like diazoaminobenzene, azobisisobutyronitrile, azodicarbonamide, azodicarbonic acid, benzene sulfonyl hydrazide, benzene-1,3-disulfonylhydrazide, diphenyloxide-4,4'-disulfonylhydrazide, p-toluenesulfonic acid hydrazide, N,N'-dinitrosopentamethylenetetraamine, N,N-dimethyl-N,N'-dinitrosophthalamide, and sodium carbonate blends with acidic compounds such as tartaric acid, and the like.

Additives further include rheological modifiers, which may act to increase the molecular weight such as by chain extension of the resin prepolymer. Suitable modifiers include Group II oxides and hydroxides, such as calcium or magnesium oxide; carbodiamides; aziridines; and polyisocyanates. It is believed that the foregoing modifiers act chemically by co-reacting into the polymer backbone at carboxy or hydroxy sites. Other suitable modifiers include polytetrafluoroethylene (PTFE); perfluoropolyether (PFPE), and polyethylene. These modifiers may act to reduce shear and thus promote flow in the composition during molding. Fumed silica is an example of a substance that may act mechanically to increase molding viscosity and therefore be a suitable rheological modifier. Combinations of two or more rheological modifiers may be desirable for optimum properties. They may be used to modify the resin structure to prevent phase separation of the resin from the conductive filler.

The rheological modifiers may be used in an amount effective to prevent phase separation during molding. A suitable amount of group II oxides (including group II hydroxides and mixtures of these compounds) is about 0.1 to about 2 weight percent, based on the total weight of the composition. Within this range, it may be preferred to use at least about 0.2 weight percent, more preferably at least about 0.3 weight percent. Also within this range, it may be preferred to use up to about 1 weight percent, more preferably up to about 0.8 weight percent, yet more preferably up to about 0.7 weight percent.

Desirable amounts of group II oxides may also be expressed as from about 0.5 to about 4.0 parts per hundred weight resin (phr). Within this range, it may be preferred to use the group II oxides in an amount of at least about 1.0 phr, more preferably at least about 1.5 phr. Also within this range, it may be preferred to use the group II oxides in an amount of up to about 3.0 phr, more preferably up to about 2.5 phr.

Specific preferred group II oxides include magnesium oxide, magnesium hydroxide, calcium oxide, and mixtures thereof. Examples of a suitable magnesium oxide additive is 99% pure magnesium oxide sold under the tradename ELASTOMAG® from Morton Thiokol, Inc. in Danvers, Mass. Other examples include a magnesium oxide dispersion sold under the tradename PG-9033 by Plasticolors, and a magnesium hydroxide dispersion also sold by Plasticolors under the tradename PG-91146. Another suitable magnesium hydroxide is Barcroft, which is a powdered version.

Examples of aziridine compounds include, for example, polyfunctional aziridines supplied by EIT, Inc. under the trade designation XAMA®, including, for example, XAMA®-2, which is identified as trimethylol propane-tris (beta-(N-aziridinyl)proprionate), and XAMA®-7, which is identified as pentaerythritol-tris-(beta-(aziridinyl)proprionate); a product of Sybron Chemicals, under the tradeneme IONAC® including PFAZ-322, identified as a trifunctional aziridine; and including CX-100, a product of Zeneca Resins, identified as a polyfunctional aziridine. A suitable amount of aziridine and/or polyisocyanate modifiers is about 1 to about 15 weight percent, based on the total weight of the composition. Within this range, it may be preferred to use an aziridine and/or polyisocyanate modifier amount of at least about 3 weight percent, more preferably at least about 3 weight percent. Also within this range, it may be preferred to use an aziridine and/or polyisocyanate modifier amount of up to about 10 weight percent, more preferably up to about 9 weight percent, yet more preferably up to about 8 weight percent, based on the total weight of the composition.

The aziridine and/or polyisocyanate modifier amount can also be expressed as from about 0.5 to about 20 phr. Within this range, it may be preferred to use an aziridine and/or polyisocyanate modifier amount of at least about 1 phr, more preferably at least about 2 phr. Also within this range, it may be preferred to use an aziridine and/or polyisocyanate modifier amount of up to about 17 phr, more preferably up to about 15 phr.

Suitable polyisocyanates are described, for example, in U.S. Pat. No. 5,268,400. A specific diisocyanate that may be used is diphenylmethane diisocyanate, such as that sold by ICI Americas of West Deptford, N.J., under the tradename RUBINATE® R MF-1780. Additionally, a suitable diisocyanate is LUPRANATE® MP102, solvent free urethane-modified diphenylmethane diisocyanate from BASF.

Suitable amounts of polytetraflooroethylene (PTFE) and/or perfluoropolyether (PFPE) may be about 0.5 to about 2 weight percent, based on the total weight of the composition. Within this range, it may be preferred to use an amount of at least about 0.6 weight percent, more preferably at least about 0.7 weight percent. Also within this range, it may be preferred to use up to about 1.8 weight percent, more preferably up to about 1.3 weight percent.

The amount of PTFE and/or PFPE may also be expressed as about 0.5 to about 20 phr. Within this range, it may be preferred to use at least about 3 phr, more preferably at least about 5 phr. Also within this range, it may be preferred to use up to about 15 phr, more preferably up to about 12 phr.

A suitable fine particle PTFE powder (having an average particle size by Coulter Counter of less than-microns) is sold under the tradename Marzon #5 by Marshall Products Company of West Chester Pa.

Suitable polyethylenes includes linear low density polyethylenes, such as that sold by Equistar of Houston Tex. under the tradename FN 510. A suitable polyethylene amount is about 3 to about 20 phr. Within this range, it may be preferred to use a polyethylene amount of at least about 4 phr, more preferably at least about 5 phr. Also within this range, it may be preferred to use a polyethylene amount of up to about 17 phr, more preferably up to about 15 phr.

Fumed silica could be used at about 0.5 to about 20 phr. Within this range, it may be preferred to use at least about 1 phr. Also within this range, it may be preferred to use up to about 10 phr.

In a preferred embodiment, the composition is substantially free of water, meaning that the composition comprises water in an amount less than about 1 weight percent, preferably less than about 0.5 weight percent, more preferably less than about 0.1 weight percent, based on the total weight of the composition.

There is no particular limitation on the method by which the composition is prepared. The composition may be prepared by forming an intimate blend of the functionalized poly(arylene ether), the alkenyl aromatic monomer, the acryloyl monomer, and the conductive agent. When the functionalized poly(arylene ether) is a capped poly(arylene ether), the composition may be prepared directly from an uncapped poly(arylene ether) by dissolving the uncapped poly(arylene ether) in a portion of the alkenyl aromatic monomer, adding a capping agent form the capped poly (arylene ether) in the presence of the alkenyl aromatic monomer, and adding the acryloyl monomer, the conductive agent, and any other components to form the thermoset composition. The composition may also be formed by dispersing particulate functionalized poly(arylene ether) in the other components, where the particulate (i.e., powder) preferably has a particle size of about 0.5 to about 300 micrometers.

In a preferred embodiment, the composition may be formed by blending the functionalized poly(arylene ether), the alkenyl aromatic monomer, the acryloyl monomer, and the conductive agent with a mixing energy of less than about 50 kilojoules per liter (kJ/L), where the volume dimension expressed in liters refers to the volume of the composition being mixed. It has been found that the balance of physical and electrical properties of the cured composition is sensitive to the manner in which the components in the curable composition are mixed. In particular it has been found that typical high-energy, high-shear methods favored for their effect on the mechanical properties of the cured composition may cause an undesirable reduction in the electrical conductivity. It has been found that a desirable balance of mechanical and electrical properties may be obtained when the curable composition is mixed with a mixing energy less than about 50 kJ/L, preferably less than about 35 kJ/L, more preferably less than about 30 kJ/L. In order that mechanical properties of the composition are not unnecessarily compromised, it may be preferred to mix the components of the curable composition with a mixing energy of at least about 0.025 kJ/L, more preferably at least about 0.25 kJ/L, yet more preferably at least about 2.5 kJ/L.

In another preferred embodiment, the method comprises blending the functionalized poly(arylene ether), the alkenyl aromatic monomer, the acryloyl monomer, and the conductive agent with a mixing power less than about 750 watts/liter (W/L), preferably less than about 500 W/L, more preferably less than about 450 W/L. In order that mechanical properties of the composition are not unnecessarily compromised, it may be preferred to mix the components of the curable composition with a mixing power of at least about 5 W/L HP/liter, more preferably at least about 50 W/L, yet more preferably at least about 100 W/L.

In another preferred embodiment, the method comprises blending the functionalized poly(arylene ether), the alkenyl aromatic monomer, the acryloyl monomer, and the conductive agent with a tip speed less than about 35 meters/sec (m/s), preferably less than about 25 m/s, more preferably less than about 15 m/s. In order that mechanical properties of the composition are not unnecessarily compromised, it may be preferred to mix the components of the curable composition with a tip shear rate of at least about 0.05 m/s, more preferably at least about 0.15 m/s, yet more preferably at least about 0.5 m/s. The tip speed of a mixer is the maximum velocity of any part of the mixer contacting the composition.

There is no particular limitation on the method or apparatus used to blend the components of the curable composition. Suitable internal blending methods include dough mixing, Banbury mixing, helicone mixing, Henschel mixing, plow mixing, agitated vessel mixing, and the like, and combinations comprising at least one of the foregoing methods, which are known to those skilled in the art. Preferred blending methods include dough mixing, Henschel mixing, and the like, and combinations comprising at least one of the foregoing methods.

There is no particular limitation on the method by which the composition may be cured. The composition may, for example, be cured thermally or by using irradiation techniques, including UV irradiation and electron beam irradiation. When heat curing is used, the temperature selected may be about 80° to about 300° C. Within this range, a temperature of at least about 120° C. may be preferred. Also within this range, a temperature up to about 240° C. may be preferred. The heating period may be about 30 seconds to about 24 hours. Within this range, it may be preferred to use a heating time of at least about 1 minute, more preferably at least about 2 minutes. Also within this range, it may be preferred to use a heating time up to about 10 hours, more preferably about 5 hours, yet more preferably up to about 3 hours. Such curing may be staged to produce a partially cured and often tack-free resin, which then is fully cured by heating for longer periods or temperatures within the aforementioned ranges.

The cured composition may preferably exhibit a glass transition temperature of at least about 100° C., more preferably 120° C., yet more preferably at least about 130° C., still more preferably at least about 140° C.

The cured composition may preferably exhibit a volume conductivity, measured as described in the examples below, of at least about 5 S/cm, more preferably at least about 20 S/cm, yet more preferably at least about 30 S/cm, still more preferably at least about 40 S/cm.

The cured composition may preferably exhibit a surface conductivity, measured as described in the examples below, of at least about 20 S/cm, more preferably at least about 50 S/cm, yet more preferably at least about 80 S/cm, still more preferably at least about 110 S/cm.

The cured composition may preferably exhibit a coefficient of thermal expansion (CTE) below its glass transition temperature of not greater than about 30 micrometers/meter-° C. (μm/m-° C.), more preferably not greater than about 25 μm/m-° C., yet more preferably not greater than about 20 μm/m-° C.

The cured composition may preferably exhibit a flexural strength measured at 23° C. according to ASTM D6272 of at least about 4,000 psi, preferably at least about 5,000 psi.

The cured composition may preferably exhibit a flexural modulus measured at 23° C. according to ASTM D6272 of at least about 1,000 kpsi, more preferably at least about 1,200 kpsi, yet more preferably at least about 1,500 kpsi.

The cured composition may preferably exhibit a notched and unnotched Izod impact strengths measured at 23° C. according to ASTM D256 of at least about 0.25 ft-lb/in, more preferably at least about 0.50 ft-lb/in, yet more preferably at least about 0.75 ft-lb/in.

The cured composition may preferably exhibit a tensile strength measured at 23° C. according to ASTM D638 of at least about 4,000 psi, more preferably at least about 5,000 psi, yet more preferably at least about 6,000 psi.

The cured composition may preferably exhibit a tensile modulus measured at 23° C. according to ASTM D638 of at least about $1.5 \times 10^6$ psi, more preferably at least about $2 \times 10^6$ psi.

There is no particular limitation on techniques used to fabrication articles comprising the composition. Processes useful for processing the composition include those generally known to the art for the processing of thermosetting resins. Such processes have been described in "Polyesters and Their Applications" by Bjorksten Research Laboratories, Johan Bjorksten (pres.) Henry Tovey (Ch. Lit. Ass.), Betty Harker (Ad. Ass.), James Henning (Ad. Ass.), Reinhold Publishing Corporation, New York, 1956, "Uses of Epoxy Resins", W. G. Potter, Newnes-Buttersworth, London 1975, "Chemistry and Technology of Cyanate Ester Resins" by I. Hamerton, Blakie Academic Publishing an Imprint of Chapman Hall. Processing techniques include casting, including for example centrifugal and static casting; contact molding, including cylindrical contact molding; compression molding; sheet molding; bulk molding; lamination including wet or dry lay up and spray lay up; resin transfer molding, including vacuum assisted resin transfer molding and chemically assisted resin transfer molding; injection molding, including reaction injection molding (RIM); atmospheric pressure molding (APM); open mold casting; Seeman's Composite Resin Infusion Manufacturing Processing (SCRIMP); pultrusion; formation into high strength composites; open molding or continuous combination of resin and glass; and filament winding, including cylindrical filament winding.

The composition is suitable for a use in a variety of articles requiring high conductivity. For example, the composition may be used to form components of an electrochemical cell. A preferred use of the composition is in bipolar plates for use in fuel cells. The bipolar plate may be made by any suitable process, but is preferably prepared by injection or compression molding the composition into the desired shape and size, and then combining the porous conductive layers with the molded layer by compression molding a multilayer composite of the molded layer positioned between two layers of the porous conductive material. Alternatively, sheets of a filled thermoplastic material may be compression molded between layers of the porous conductive material. In a third embodiment, a filled thermoplastic material may be injected between two layers of the porous conductive material in a mold, and then the resulting composite is compression molded. Details of these and other methods may be found, for example, in U.S. Pat. No. 6,103,413 to Hinton et al., U.S. Pat. No. 6,251,308 B1 to Butler, and U.S. Pat. No. 6,248,467 B1 to Wilson et al.; and International Patent Application No. WO 99/19389.

In a preferred embodiment, the composition may be pre-formed into a desired shape prior to compression molding. First, the composition is mixed to achieve uniform distribution of conductive agent. Second, the mixed material is placed in a small pre-form mold where the composition is compacted at a temperature below the curing temperature of the thermoset; trapped air is allowed to escape from the mold and the composition is compacted while a pressure is applied to the mold. Third, the packed material is removed from the mold in the form of an article of packed material. Fourth, the material, in pre-compressed form, is placed inside of the compression mold and processed in the normal compression molding fashion.

The invention is further illustrated by the following non-limiting examples.

GENERAL EXPERIMENTAL

For the following Examples, the poly(2,6-dimethyl-1,4-phenylene ether) (PPE) was obtained from the General Electric Company. Calcium carbonate was obtained from Omya Corporation and sold under the tradename OMYAC-ARB® 5. Glass, either as continuous glass mat or chopped ½ inch fibers, was obtained from Owens Corning Fiberglass Corporation. All reagents were obtained from Aldrich Chemical Company unless otherwise specified. Gel permeation chromatography (GPC) was performed using a Waters Gel Permeation Chromatograph with a bank of PHENOMENEX® Phenogel $10^5$, $10^4$, and 500 Angstrom columns. A polymer solution (100 ml, approximately 0.3% by weight) was injected and the polymer eluted from the column using a chloroform solvent containing 0.5% ethanol at a flow rate of 1.5 m/min. Elution was monitored using a UV detector set at 254 nm. The columns were calibrated using polystyrene standards (2,030 to 860,000 g/mol). $^1$H-NMR spectra were collected on a GE QE-300 MHz NMR spectrometer using CDCl$_3$ solvent and a tetramethylsilane (TMS) internal standard. Methacrylic endcap concentration ([MAA]) was determined by $^1$H-NMR analysis by comparison of the integrals of the methyacrylic vinyl hydrogens to those of the aromatic hydrogens of the PPE repeat unit. $^{31}$P-NMR spectra were recorded on a GE GN-500 MHz spectrometer with hydroxyl endgroup concentration ([OH]) performed as described by P. Chan, D. S. Argyropolis, D. M. White, G. W. Yeager, and A. S. Hay, Macromolecules, 1994, volume 27, pages 6371 ff. Intrinsic viscosity (IV) measurements were performed at 25° C. from chloroform solutions using an Ubbelohde viscometer.

Resin Transfer molded samples were prepared using a Radius FlowWare RTM 2100 Injector, and the resin injected to a 10"×10"×0.125" plaque mold under 200 pound per square inch (psi) pressure. The glass transition temperatures ($T_g$) and coefficients of thermal expansion (CTE) were determined according to ASTM D6341. Decomposition onset temperatures in nitrogen and air were measured by thermogravimetric analysis (TGA) by placing resin samples of approximately 3 mm$^3$ in size in a platinum pan and performing the test using a TA Instruments TGA2950 run at atmospheric pressure under a constant flow (60 ml/min) of nitrogen or air. The temperature was increased at 20° C./min from 30 to 700° C.

Flexural modulus and flexural strength values were measured according to ASTM D6272.

PREPARATIVE EXAMPLES 1-3

To a solution of 3 L of toluene in a 5-liter 3-necked round bottom flask was added 1500 g of poly(2,6-dimethyl-1,4-phenylene ether) resin (intrinsic viscosity=0.15 dl/g), 153 g (1.0 mol) of methacrylic anhydride, and 121 g (1.0 mol) of dimethylaminopyridine. The solution was heated at reflux overnight. The desired product was precipitated into methanol and isolated by filtration. The resulting product was dried at 80° C. overnight in vacuo. The yield of product was 1333 g. $^{31}$P-NMR (CDCl$_3$; 2,3-dioxaphospholane). No detectable PPE-OH groups (<5 μmol/g). $^1$H-NMR (CDCl$_3$, TMS): 2.07 (s, 6H; PPE CH$_3$); 2.18 (s, 3H, methacrylate CH$_3$); 5.74 (s, 2H, methacrylate CH$_2$); 6.46 (s, 2H PPE Ar—H); 7.08 (m, 3H, PPE tail endgroup).

Using the procedure described above, three different molecular weight poly(2,6-dimethyl-1,4-phenylene ether) resins were methacrylate-capped with methacrylic anhydride (MAA-capped PPE for brevity). The properties of the resins are listed below in Table 1.

TABLE 1

|  | MAA-Capped PPE | | |
| --- | --- | --- | --- |
|  | Prep. Ex. 1 | Prep. Ex. 2 | Prep. Ex. 3 |
| IV before capping (dl/g) | 0.12 | 0.15 | 0.25 |
| Mw (AMU) | 7,587 | 11,562 | 31,413 |
| Mn (AMU) | 4,564 | 6,066 | 17,660 |
| Dispersity | 1.66 | 1.91 | 1.78 |
| Tg (° C., DSC) | 153.4 | 169.6 | 202.0 |
| [MAA] (μmol/g) | 349.8 | 271.1 | 136.3 |
| [OH] (μmol/g) | ND | ND | ND |

ND = Not detectable (<5 μmol/g)

PREPARATIVE EXAMPLE 4

This example describes the preparation of a poly(salicylate)-capped 0.25 IV PPE Resin/Styrene blend. Using the procedure from Example 3 of U.S. Pat. No. 4,760,118 to White et al., a poly(salicylate)-capped polyphenylene ether was prepared from poly(2,6-dimethyl-1,4-phenylene ether) having an intrinsic viscosity of 0.25 dl/g and 10 weight percent (based on PPE) polysalicylate. The product capped PPE was dissolved in styrene as a 35 weight percent solution for use as Preparative Example 4.

PREPARATIVE EXAMPLE 5

This example describes the preparation of methacrylate-capped 0.15 IV PPE Resin/Styrene blend.

A 22 liter 3-necked round-bottomed flask was charged with 8 kg (17.6 lbs) of styrene monomer (Ashland Chemical; Lot # 074B00508). The solution was warmed to 85° C. with constant stirring. During this time 8 kg (17.06 lbs) of poly(2,6-dimethyl-1,4-phenylene ether) having an intrinsic viscosity of 0.15 dL/g was added. After addition was complete, the reaction mixture was stirred at 85° C. for approximately 1 hour until the resin had dissolved. The reaction mixture was then treated with 936.2 g of N,N-dimethylaminopyridine (DMAP, Avocado Labs, Inc.) and 958 g (925 ml, d=1.035 g/ml) of methacrylic anhydride (Monomer-Polymer Dajac Labs) then heated at 85° C. for 300 minutes. The reaction mixture was then cooled and the resin mixture emptied into a 5 gallon container. A small sample was precipitated into methanol and submitted for analysis. Both the precipitated sample and the PPE/Styrene mixture were analyzed. Precipitated PPE sample: $^{31}$P-NMR (CDCl$_3$; 2,3-dioxaphospholane/pyridine functionalized): δ=128.30 ppm (BPA internal std., Concentration=1000 ppm); δ=129.53 ppm (residual methacrylate CO$_2$H/CO$_2^-$; concentration=339 ppm); No detectable PPE-OH groups (<5 μmol/g). GPC: PPE retention time=22.97 minutes; Mw=10,906, Mn=6842, Mw/Mn=1.4; DSC: 167.4° C.; TGA % residue at 700° C.=28.8%; Weight Loss at 400° C.=2.1%; Decomposition Onset=459.7° C. $^1$H-NMR (CDCl$_3$, TMS): $^1$H-NMR (CDCl$_3$, TMS): 2.07 (s, 6H; PPE CH$_3$); 2.18 (s, 3H, methacrylate CH$_3$); 5.74 (s, 2H, methacrylate CH$_2$); 6.46 (s, 2H PPE Ar—H); 7.08 (m, PPE Tail endgroup).

PPE/Styrene Mixture: $^{31}$P-NMR (CDCl$_3$: 2,3-dioxaphospholane/pyridine functionalization): δ=128.30 ppm (BPA internal std., Concentration=1000 ppm); δ=129.52 ppm (residual methacrylate CO$_2$H/CO$_2$; Concentration 20978 ppm); Broad resonance at 130.7-131.5 (unidentified, not observed in precipitate sample; Concentration=4284 ppm), 128.50 ppm (unidentified, not observed in precipitate sample; Concentration=461 ppm). No detectable PPE-OH groups (<5 μmol/g). GPC: PPE retention time=23.00 minutes M$_w$=10,736, M$_n$=6,818, MP=8,316, M$_z$=17,055, M$_w$/M$_n$=1.6; styrene retention time=30.32 minutes.

PREPARATIVE EXAMPLES 6-9

Preparative Example 6 describes the preparation of Methacrylate-capped 0.12 IV PPE Resin/Styrene blend.

A 100-gallon stainless steel reactor was charged with 68.03 kg (150 lbs) of Styrene monomer (Ashland Chemical; Lot # 074B00508). The solution was warmed, under a nitrogen blanket, from 39-79° C. over 75 minutes. During this time, 68.03 kg (150 lbs) of poly(2,6-dimethyl-1,4-phenylene ether) having an intrinsic viscosity of 0.12 dL/g was added. After addition was complete the reaction mixture was stirred at 74-85° C. for 85 minutes to ensure dissolution of the PPE resin. The reaction mixture was then treated with 936.2 g of N,N-dimethylaminopyridine (DMAP, Avocado Labs, Inc). After 20 minutes, 8.156 kg (7.88 liters, d=1.035 g/ml) of methacrylic anhydride (Monomer-Polymer Dajac Labs) was added. The reaction mixture was heated at 85° C. for 305 minutes. The reaction was then cooled to approximately 50° C. and the resin mixture drained into ten 5 gallon containers. Yield: 143.35 kg (145.15 kg theoretical, 99%) of resin solution. GPC: PPE retention time=23.65 minutes; Mw=7532, Mn=5390, Mw/Mn=1.4; Residual styrene retention time=29.82 minutes. DSC: Tg=141.3° C.; TGA % residue at 700° C.=25.0%; Weight Loss at 400° C.=5.2%; Decomposition Onset=450.8° C.

PPE/Styrene Mixture: $^{31}$P-NMR (CDCl$_3$; 2,3-dioxaphospholane/pyridine functionalization): δ=128.30 ppm (BPA internal std., Concentration=1000 ppm); δ=129.53 ppm (residual methacrylate CO$_2$H/CO$_2$; Concentration=6571 ppm); Broad resonance at 130.7-131.5. (unidentified, not observed in ppt. sample; Concentration=692 ppm); δ=128.50 ppm (unidentified, not observed in ppt. sample; Concentration=437 ppm). No detectable PPE-OH groups (<5 μmol/g). GPC: PPE retention time=23.67 minutes M$_w$=7,442, M$_n$=5,355, MP=5,653, M$_z$=11,113, M$_w$/M$_n$=1.4; Styrene retention time=30.30 minutes.

Using the procedure described above, four different molecular weight poly(2,6-dimethylphenyl ether) resins were capped with methacrylic anhydride (MAA-capped PPE for brevity) or acrylic anhydride (AA-capped PPE). The properties of the resins are listed below in Table 2. Weight-average molecular weight (M$_w$) and number-average molecular weight (M$_n$) were determined by gel permeation chromatography.

TABLE 2

|  | Prep. Ex. 4 | Prep. Ex. 5 | Prep. Ex. 6 | Prep. Ex. 7 | Prep. Ex. 8 | Prep Ex. 9 |
|---|---|---|---|---|---|---|
| IV before capping (dl/g) | 0.25 | 0.12 | 0.15 | 0.25 | 0.30 | 0.25 |
| Capping Agent | Psal | MAA | MAA | MAA | MAA | AA |
| capped PPE conc. in styrene (wt %) | 35 | 50 | 50 | 35 | 35 | 35 |
| M$_w$ (AMU) | — | 7,532 | 10,906 | 31,413 | — | — |
| M$_n$ (AMU) | — | 5,355 | 6,842 | 17,660 | — | — |
| Dispersity | — | 1.66 | 1.91 | 1.78 | — | — |
| [OH] (μmol/g) | — | ND | ND | ND | ND | ND |

MAA = Methacrylic Anhydride
AA = Acetic Anhydride
ND = Not detectable (<5 μmol/g)

EXAMPLES 1-12

Materials: preparation of methacrylate- and salicylate-capped polyphenylene ethers are described above; trimethylpropane triacrylate and trimethylpropane trimethacrylate were obtained from Sartomer Chemical Co.; styrene and t-butylperoxybenzoate were from Aldrich Chemical Co. Graphites A (Grade 4012) and B (Grade 3243) were obtained from Asbury Graphite Mills, Inc.; graphite C (TIMREX® KS5-65TT) was obtained from Timrex Ltd.

Using the components and amounts specified in Table 3, the capped poly(phenylene ether) solution in styrene, the polyfunctional acrylate comonomer, and additional styrene (if required) were mixed and heated to approximately 70° C. to form a homogeneous solution. The solution was then hand mixed with graphite to form a particulate solid. A prototype bipolar plate tool was heated to 295° F. and sprayed with a fluorocarbon mold release. Approximately 70 grams of the resin/graphite mixture was poured into the tool and the mixture was compression molded under the conditions shown in Table 3 to yield parts that were tested as follows. Appearance was judged based on whether the sample could be removed from the tool without cracking, an on whether significant levels of blistering or delamination were observed in the molded part. If neither of these situations existed then the appearance was determined to be good. Glass transition temperature (T$_g$) and coefficient of thermal expansion (CTE) both above and below T$_g$ were measured according to ASTM E1545.

The surface (in-plane) conductivity was determined according ASTM F1529, in five areas along the as-molded surface of each plaque. Conductivity testing using this four-point method was achieved by running a current through the sample and measuring the voltage drop across a pre-determined length of the sample. The procedure began by lowering the four-point test probe onto the specimen. A current of 10 milliamperes was applied through the outermost two prongs of the test head, while the innermost two prongs measured the voltage across the sample surface. Measurements were taken at five positions on each sample, each position being at least one probe width away from the edge of the sample.

Using the measurements described above, sheet resistance was calculated for each sample according to the equation $$R_s = (2*pi*s)/t*V/I$$

where $R_s$ is the sheet resistance expressed in ohms, s is the probe spacing on the 4-point probe device expressed in centimeters, t is the specimen thickness expressed in centimeters, V is the measured voltage drop expressed in volts, and I is the applied current expressed in amperes. Surface resistivity was then calculated from the sheet resistance according to the equation $$\rho_s = R_s * t$$

10 minutes to avoid the water peak. The injection temperature was 250° C. After the desorption was complete the difference in the masses of the sample before and after testing gave the % weight loss. Since volatile components such as water were not quantified by GPC analysis, the difference between the % weight loss determined by heating the samples and the weight loss accounted for by organic volatiles is presumably due to desorbed water.

Test results are given in Table 3.

TABLE 3

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| COMPOSITION/PROCESS | | | | | | | | | | | | |
| 0.25 IV PPO-MAA/Styrene (35% wt/wt) (g) | 85 | 85 | 85 | 85 | 85 | 85 | 85 | 85 | 85 | 85 | 0 | 0 |
| 0.12 IV PPO-MAA/Styrene (50% wt/wt) (g) | 0 | 0 | 0 | 0 | 0 | 0 | 0 | 0 | 0 | 0 | 85 | 0 |
| 0.25 IV PPO-PSal/Styrene (35% wt/wt) (g) | 0 | 0 | 0 | 0 | 0 | 0 | 0 | 0 | 0 | 0 | 0 | 85 |
| Trimethylolpropane triacrylate (g) | 15 | 15 | 0 | 0 | 20 | 0 | 20 | 0 | 15 | 15 | 15 | 15 |
| Trimethylolpropane trimethacryate (g) | 0 | 0 | 15 | 15 | 0 | 20 | 0 | 20 | 0 | 0 | 0 | 0 |
| Styrene (g) | 0 | 0 | 0 | 0 | 15 | 15 | 15 | 15 | 0 | 0 | 0 | 0 |
| t-butylperoxybenzoate (g) | 2 | 2 | 2 | 2 | 2 | 2 | 3 | 3 | 2 | 2 | 2 | 2 |
| Graphite type | A | A | A | A | A | A | A | A | B | C | A | A |
| Graphite (g) | 408 | 408 | 408 | 408 | 408 | 408 | 408 | 408 | 408 | 408 | 408 | 408 |
| Cure Temp (° C.) | 295 | 295 | 295 | 295 | 295 | 295 | 295 | 295 | 295 | 295 | 295 | 295 |
| Cure Time (min) | 5 | 2 | 5 | 2 | 5 | 5 | 5 | 5 | 5 | 5 | 5 | 5 |
| PROPERTIES | | | | | | | | | | | | |
| Appearance | good | good | good | good | good | good | good | good | blistered, cracked | blistered, cracked | cracked | cracked |
| Tg (° C.) | 136 | 143 | 144 | 171 | 141 | 139 | 129 | 139 | ND* | ND | 152 | 131 |
| CTE below Tg ($10^{-6}$/° C.) | 18.2 | 10.7 | 16.1 | 12.2 | 27.2 | 13.4 | 12.5 | 11.1 | ND | ND | 27.2 | 12.2 |
| CTE above Tg ($10^{-6}$/° C.) | 42 | 30.6 | 40.7 | 22.6 | 59.5 | 24.2 | 22.4 | 16.9 | ND | ND | 77.9 | 23.4 |
| Surface Conductivity (S/cm) | 112 | 146 | 125 | — | 181 | 185 | 162 | 155 | ND | ND | ND | ND |
| weight loss (%) | 0.03 | 0.09 | 0.08 | 0.08 | 0.06 | 0.08 | 0.06 | 0.09 | ND | ND | 0.07 | 0.04 |
| Residual Ethylbenzene (ppm) | 0.016 | 0.009 | 0.007 | 0.004 | 0.003 | 0.01 | 0.005 | 0.004 | ND | ND | ND | ND |
| Residual t-butanol (ppm) | 5 | 1.9 | 2.6 | 1 | 1.6 | 3.1 | 2.8 | 2.2 | ND | ND | 1.2 | 0.8 |
| Residual Toluene (ppm) | 0.1 | 0.03 | 0.05 | 0.03 | 0.04 | 0.05 | 0.03 | 0.04 | ND | ND | 0.05 | 0.03 |
| Residual Styrene (ppm) | 0.083 | 0.071 | 0.018 | 0.074 | 0.003 | 0.058 | 0.018 | 0.006 | ND | ND | 0 | 0 |

*ND = not determined where $\rho_s$ is the surface resistivity in ohm-cm and t is the sheet thickness in centimeters. Finally, surface conductivity was calculated as the reciprocal of surface resistivity:

$$\gamma_s = 1/\rho_s$$

where $\gamma_s$ is the surface conductivity in S/cm.

The volatiles components (ethylbenzene, t-butanol, toluene, and styrene) were determined by desorption from the sample using a Tekmar 5000 thermal desorber. The sample was heated at 70° C. for 40 minutes in a helium stream with the volatiles captured in a primary packed trap at −100° C. and then transferred to a cryofocus trap also at 100° C. The volatiles were analyzed using a Hewlett Packard (now Agilent) HP5890 gas chromatograph fitted with a Model 5970 Mass Selective Detector. The column used was a 30 meter×0.32 millimeter fused silica MDN-5S capillary with a 0.50 micron film thickness. The column oven program was 35° C. for 5 minutes and then increasing at 2° C./minute to 285° C. with a 5 minute hold. The total run time was 22.5 minutes. The mass scan range was 19 to 300 atomic mass units (AMU) from 0 to 10 minutes and 19 to 440 AMU after As shown the materials were highly conductive and exhibited high glass transition temperatures.

EXAMPLES 13-22, COMPARATIVE EXAMPLES 1-4

These examples illustrate that the composition provides superior flexural strength compared to compositions comprising a commercially available polyester resin.

Using the procedure described above for Preparative Example 6, a 35 weight/weight percent solution of methacrylate-capped poly(2,6-dimethyl-1,4-phenylene ether) in styrene was prepared. The poly(arylene ether) prior to capping had an intrinsic viscosity of 0.30 dL/g in chloroform at 25° C. The examples also used trimethylolpropane trimethacrylate, additional styrene, and t-butylperoxybenzoate initiator. Comparative Examples 1-4 used a vinyl ester resin obtained from Dow as DERAKAN® M311-450, and t-butyl peroxybenzoate initiator. Compositions were mixed using the proportions specified in Table 4 and the procedures described above for Examples 1-12, then compression molded into a solid ⅛ inch thick by 3 inch diameter plaque for a time and temperature to effect full cure (typically about 10 minutes at about 150° C. and about 4,000 psi).

Component amounts given in Table 4 are weight percents based on the total weight of the composition. Flexural strengths were measured according to ASTM D790. Surface (in-plane) conductivities were measured as described above. Volume (through-plane) conductivities were measured as follows. One-inch square electrodes were contacted with pressure to the top and bottom as-molded surfaces of the plaque. A constant current was applied, and the voltage between the electrodes was measured. The volume resistance was calculated according to Ohm's law $$R_v = V/I$$

where $R_v$ is the calculated volume resistance in ohms, V is the measured voltage in volts, and I is the applied current in amperes. The volume resistivity was then calculated according to the equation $$\rho_v = (A/t)R_v$$

where $\rho_v$ is the calculated volume resistivity in ohm-cm, A is the electrode area in cm$^2$, t is the sample thickness in cm, and $R_v$ is the measured resistance in ohms. Volume conductivity was calculated as the reciprocal of volume resistivity:

$$\gamma_v = 1/\rho_v$$

where $\gamma_v$ is the volume conductivity in S/cm.

Property values are given in Table 4. Pair-wise comparison of Ex. 16 with C. Ex. 1, Ex. 18 with C. Ex. 2, Ex. 20 with C. Ex. 3, and Ex. 22 with C. Ex. 4 shows that the composition of the invention provides higher flexural strength at a given graphite loading compared to compositions using a commercial polyester resin.

TABLE 4

|  | Ex. 13 | Ex. 14 | Ex. 15 | Ex. 16 |
|---|---|---|---|---|
| COMPOSITION |  |  |  |  |
| 0.30 IV PPO-MAA (wt %) | 4.85 | 5.31 | 5.79 | 6.29 |
| Trimethylolpropane trimethacryate (wt %) | 3.26 | 3.57 | 3.89 | 4.23 |
| total styrene (wt %) | 11.47 | 12.54 | 13.67 | 14.85 |
| vinyl ester resin | — | — | — | — |
| initiator | 0.49 | 0.54 | 0.58 | 0.63 |
| graphite (wt %) | 79.90 | 78.10 | 76.10 | 74.00 |
| PROPERTIES |  |  |  |  |
| flexural strength, mean (psi) | — | 5163 | — | 4800 |
| flexural strength, std. dev. (psi) | — | 217 | — | 223 |
| surface conductivity, mean (S/cm) | 134.4 | 116.5 | 102.2 | 85.8 |
| surface conductivity, std dev (S/cm) | 4.6 | 3.7 | 7.8 | 10.1 |
| volume conductivity, mean (S/cm) | 52.5 | 46.3 | 32.8 | 26.5 |

|  | C. Ex. 1 | Ex. 17 | Ex. 18 | C. Ex. 2 |
|---|---|---|---|---|
| COMPOSITION |  |  |  |  |
| 0.30 IV PPO-MAA (wt %) | — | 6.79 | 7.28 | — |
| Trimethylolpropane trimethacryate (wt %) | — | 4.57 | 4.89 | — |
| total styrene (wt %) | — | 16.04 | 17.18 | — |
| vinyl ester resin | 25.37 | — | — | 29.35 |
| initiator | 0.63 | 0.68 | 0.73 | 0.73 |
| graphite (wt %) | 74.00 | 71.90 | 69.90 | 69.90 |

TABLE 4-continued

| PROPERTIES |  |  |  |  |
|---|---|---|---|---|
| flexural strength, mean (psi) | 4289 | — | 5355 | 4678 |
| flexural strength, std. dev. (psi) | 340 | — | 201 | 334 |
| surface conductivity, mean (S/cm) | — | 53.9 | 104.3 | — |
| surface conductivity, std. dev. (S/cm) | — | 6.8 | 13.61 | — |
| volume conductivity, mean (S/cm) | — | 12.4 | 32.5 | — |

|  | Ex. 19 | Ex. 20 | C. Ex. 3 | Ex. 21 |
|---|---|---|---|---|
| COMPOSITION |  |  |  |  |
| 0.30 IV PPO-MAA (wt %) | 7.84 | 8.35 | — | 9.09 |
| Trimethylolpropane trimethacryate (wt %) | 5.27 | 5.61 | — | 6.11 |
| total styrene (wt %) | 18.50 | 19.71 | — | 21.47 |
| vinyl ester resin | — | — | 33.68 | — |
| initiator | 0.79 | 0.84 | 0.84 | 0.92 |
| graphite (wt %) | 67.60 | 65.50 | 65.50 | 62.40 |
| PROPERTIES |  |  |  |  |
| flexural strength, mean (psi) | — | 5089 | 4495 | — |
| flexural strength, std. dev. (psi) | — | 401 | 347 | — |
| surface conductivity, mean (S/cm) | 75.4 | 88.3 | — | 39.8 |
| surface conductivity, std. dev. (S/cm) | 22.2 | 19.6 | — | 4.15 |
| volume conductivity, mean (S/cm) | 18.3 | 30.0 | — | 7.4 |

|  | Ex. 22 | C. Ex. 4 |
|---|---|---|
| COMPOSITION |  |  |
| 0.30 IV PPO-MAA (wt %) | 9.61 | — |
| Trimethylolpropane trimethacryate (wt %) | 6.46 | — |
| total styrene (wt %) | 22.68 | — |
| vinyl ester resin | — | 38.75 |
| initiator | 0.97 | 0.97 |
| graphite (wt %) | 60.30 | 60.30 |
| PROPERTIES |  |  |
| flexural strength, mean (psi) | 5161 | 4868 |
| flexural strength, std. dev. (psi) | 177 | 158 |
| surface conductivity, mean (S/cm) | 19.6 | — |
| surface conductivity, std. dev. (S/cm) | 5.6 | — |
| volume conductivity, mean (S/cm) | 3.6 | — |

EXAMPLES 23 AND 24

These examples illustrate the rapid curing properties of the resin portion of the composition. A resin composition without conductive agent was prepared. It consisted of 69.5 weight percent of a 35 weight percent solution of methacrylate-capped poly(2,6-dimethyl-1,4-phenylene ether) in styrene, 16.3 weight percent of trimethylolpropane trimethacrylate, 12.2 weight percent of additional styrene, and 2.00 weight percent of t-butylperoxybenzoate. The curing rate of the resin composition was monitored at 130° C. (Example 23) and 150° C. (Example 24) using a Micromet ICAM 2000 cure analyzer and an MP 2000 minipress. At each temperature, a sample was cured in the minipress and the ion mobility measured as a function of time. The cure times reported are the times required for the slope of the log(ion mobility) vs. time curve to equal 1. This corresponded to approximately 95+% conversion. The composition exhibited cure times of 114 seconds at 130° C. and 72 seconds at 150° C. These cure times are expected to be representative of those that would be obtained in compositions comprising conductive agent.

EXAMPLES 25-27

A series of resin/graphite compositions were formulated such that the chemical compositions were nominally identical, each containing a resin loading of 25% by weight and a graphite (Asbury 4012) loading of 75% by weight. The resin portion of the composition consisted of 70 weight percent of a solution of methacrylate-capped poly(2,6-dimethyl-1,4-phenylene ether) in styrene (35 wt % poly(arylene ether)/65 wt % styrene, the poly(arylene ether) having an intrinsic viscosity of 0.30 dl/g (GE Plastics), 12 weight percent styrene (Aldrich), 15 weight percent trimethyolpropane trimethacrylate (Sartomer), 1 weight percent mold release agent (INT-40LHT, a mixture of proprietary saturated and unsaturated fatty esters from Axel), and 2 weight percent tert-butyl peroxybenzoate (Lancaster). Four mixing methods were used to blend the liquid resin with the powdered graphite to form a blend having a powder-like consistency:

(1) Hand Mixing—the graphite was added to the warm liquid resin in approximately three portions, and the materials were folded together with a metal spatula for several minutes until the blend was uniform in texture;

(2) Dough Mixing—a commercial dough mixer, much as is used in the pastry industry, was used with a standard paddle to mix the resin and graphite for a few minutes until the blend was uniform in texture; the mixing energy was estimated to be about 1 kJ/L at a power of about 5 W/L and a tip speed of about 0.5 m/s;

(3) Low Speed HENSCHEL® Mixing—an industrial mixing unit, known to those skilled in the art as a HENSCHEL® mixer, which can be considered a high shear method, was used at a low rpm of mixing (blade revolutions of about 850 rpm) for about one minute when the blend was observed to be uniform in texture; the mixing energy was estimated to be about 2 kJ/L at a power of about 40 W/L and a tip speed of about 10 m/s;

(4) High Speed HENSCHEL® Mixing—the industrial mixing unit described in (3) was used at a high rpm of mixing (blade revolutions of about 1450 rpm) for about one minute when the blend was observed to be uniform in texture; the mixing energy was estimated to be about 7 kJ/L at a power of about 100 W/L and a tip speed of about 16 m/s.

Examples 25-27 were prepared using mixing methods (1)-(4), respectively. Each of these four blends was then compression molded into a solid ⅛ inch thick by 3 inch diameter plaque for a time and temperature to effect full cure (typically about 10 minutes at about 150° C. and about 4,000 psi).

Flexural modulus and flexural strength were measured according to ASTM D790.

Surface conductivity was measured as described above in Examples 1-12.

Mean property values are provided in Table 5. The results show that the conductivity for the given resin/graphite formulation is sensitive to the method by which it was mixed. Generally, the more aggressive mixing methods, e.g., the HENSCHEL® mixing employed in Exs. 25 and 26, yielded reduced conductivities. More aggressive mixing was associated with increased flexural strength, but the flexural strength increases on changing from dough mixing to low speed HENSCHEL® mixing to high speed HENSCHEL® mixing were modest. And flexural modulus was relatively insensitive to changes in mixing method, with dough mixing and low speed HENSCHEL® mixing yielding the highest flexural modulus values.

TABLE 5

|  | Ex. 25 | Ex. 26 | Ex. 27 | Ex. 28 |
| --- | --- | --- | --- | --- |
| surface conductivity (S/cm) | 132.0 | 62.85 | 49.59 | 25.92 |
| flexural modulus (kpsi) | 1,080 | 1,591 | 1,667 | 1,531 |
| flexural strength (psi) | 4,411 | 5,594 | 5,995 | 6,187 |

The reasons for the observed effects of mixing method on conductivity are not well understood at this time. While not wishing to be bound by any particular hypothesis, the inventors speculate that either or both of two mechanisms may contribute to the reduced conductivity associated with aggressive mixing. First, aggressive mixing may reduce the particle size or aggregate size of the graphite. Second, aggressive mixing may more completely coat the graphite particles with resin.

EXAMPLES 29-68

These examples illustrate the good molding properties and high surface conductivities of compositions comprising an optional mold release agent. Composition types A and B, detailed in Table 6, included mold release agent at 5 and 10 weight percent, based on the total composition excluding graphite filler. All mold release agents were obtained from commercial suppliers. Calcium stearate, lecithin, and glycerol monostearate were obtained from Alfa Aesar. Stearic acid was obtained from Avocado. Lauryl stearate and n-butyl stearate were obtained from Tokyo Kasei Kogyo. Oxidized polyethylene was obtained as AC 629, and polyethylene as AC 319 from Honeywell. Polytetrafluoroethylenes (PTFEs) were obtained as TL56 and TL6 from Witcon.

In addition to a mold release agent, each composition included a methacrylate-capped poly(2,6-dimethyl-1,4-phenylene ether) (PPO-MA) having an intrinsic viscosity of 0.30 dL/g, corresponding to Preparative Example 8; styrene, obtained from Aldrich Chemical Company; trimethylolpropane trimethacrylate (TMPTMA), obtained from Sartomer; and t-butyl peroxybenzoate, obtained from Lancaster.

TABLE 6

| Component | Composition Type A (weight percent) | Composition Type B (weight percent) |
| --- | --- | --- |
| Mold Release Agent | 5.0 | 10.0 |
| PPO-MA | 23.5 | 22.2 |
| Styrene | 55.1 | 52.2 |
| TMPTMA | 14.4 | 13.6 |
| t-butyl peroxybenzoate | 2.0 | 2.0 |

For each example, the resin compositions specified in Table 6 were thoroughly mixed then compounded with graphite (Grade 4012, Asbury Graphite Mills, Inc.;) in the ratio 25 weight percent resin, 75 weight percent graphite. Compounding of resin and graphite was performed using a Henschel mixer. The graphite-filled compositions were compression molded at 150° C. for 2 minutes at 2000 psi into the various geometric shapes. One criterion for measuring the effectiveness of a particular mold release agent is to determine its influence on the ability to compression mold articles with varying degrees of geometric structure ranging from simple to complex. For reference purposes only, four such structures were chosen and are defined in Table 7.

TABLE 7

| Structure Type | Nominal dimensions | Description |
|---|---|---|
| Simple Plate | 10 cm × 10 cm × 0.3 cm | flat plate with no geometric features |
| Simple Prototype | 10 cm × 10 cm × 0.3 cm | flat plates with geometric features including a series of channels of nominal dimensions 1 mm wide by 1 mm deep and spaced about 1 mm apart on one face of the plate |
| Complex Prototype | 10 cm × 10 cm × 0.3 cm | similar to the Simple Prototype except that the channels are 3 mm in depth |
| Functional Device | 20 cm × 30 cm × 0.3 cm | an article that is substantially larger than the Prototypes and has geometric features more complex that those of the complex prototype and on both faces of the article |

The mold release ability of each composition was rated as poor or good. A rating of "Poor" means that the article did not release well from the molding tool surfaces (i.e., automatic action of the knockout pins in the molding machine did not successfully remove the molded article from the mold cavity); "Good" means that the article did release well from the molding tool surfaces (i.e., automatic action of the knockout pins in the molding machine successfully removed the molded article from the mold cavity).

Surface conductivities were measured according to the procedure detailed above in EXAMPLES 1-12.

Table 8 summarizes the results, which show that all compositions tested provided good mold release of simple plates, and all but lauryl stearate and oxidized polyethylene provided good mold release of simple prototypes. Compositions with both calcium stearate and lecithin provided Functional Devices with good mold release, and the use of lecithin provided higher conductivity in molded articles than the use of calcium stearate. For less demanding molding applications, any of the mold release agents tests might be suitable.

TABLE 8

| | Mold Release Agent | Comp. Type | Structure Type | Mold Release Rating | Surface Conductivity, (S/cm) |
|---|---|---|---|---|---|
| Ex. 29 | Calcium stearate | A | Simple Plate | Good | — |
| Ex. 30 | Calcium stearate | A | Simple Prototype | Good | 75.1 |
| Ex. 31 | Calcium stearate | A | Complex Prototype | Good | 74.3 |
| Ex. 32 | Calcium stearate | A | Functional Device | Good | — |
| Ex. 33 | Calcium stearate | B | Simple Prototype | Good | — |
| Ex. 34 | Calcium stearate | B | Complex Prototype | Good | 74.8 |
| Ex. 35 | Calcium stearate | B | Functional Device | Good | — |
| Ex. 36 | Stearic acid | A | Simple Plate | Good | — |
| Ex. 37 | Stearic acid | A | Simple Prototype | Good | 101.3 |
| Ex. 38 | Lecithin | A | Simple Plate | Good | — |
| Ex. 39 | Lecithin | A | Simple Prototype | Good | 83.3 |
| Ex. 40 | Lecithin | A | Complex Prototype | Good | 86.4 |
| Ex. 41 | Lecithin | A | Functional Device | Good | 87.5 |
| Ex. 42 | Lecithin | B | Simple Prototype | Good | — |
| Ex. 43 | Lecithin | B | Complex Prototype | Good | 78.0 |
| Ex. 44 | Lecithin | B | Functional Device | Good | — |
| Ex. 45 | n-butyl stearate | A | Simple Plate | Good | — |
| Ex. 46 | n-butyl stearate | A | Simple Prototype | Poor | 71.4 |
| Ex. 47 | Lauryl stearate | A | Simple Plate | Good | — |
| Ex. 48 | Lauryl stearate | A | Simple Prototype | Poor | 75.1 |
| Ex. 49 | Glycerol monostearate | A | Simple Plate | Good | — |
| Ex. 50 | Glycerol monostearate | A | Simple Prototype | Good | — |
| Ex. 51 | Glycerol monostearate | A | Complex Prototype | Good | 82.1 |
| Ex. 52 | Glycerol monostearate | A | Functional Device | Poor | — |
| Ex. 53 | Glycerol monostearate | B | Simple Prototype | Good | — |
| Ex. 54 | Glycerol monostearate | B | Complex Prototype | Good | 81.3 |
| Ex. 55 | Glycerol monostearate | B | Functional Device | Poor | — |
| Ex. 56 | Ox. Polyethylene AC629 | A | Simple Plate | Good | — |
| Ex. 57 | Ox. Polyethylene AC629 | A | Simple Prototype | Poor | 81.9 |
| Ex. 58 | Polyethylene AC316 | A | Simple Plate | Good | — |
| Ex. 59 | Polyethylene AC316 | A | Simple Prototype | Poor | 89.4 |
| Ex. 60 | PTFE TL56 | A | Simple Plate | Good | — |
| Ex. 61 | PTFE TL56 | A | Simple Prototype | Good | 92.1 |
| Ex. 62 | PTFE Witcon TL6 | A | Simple Plate | Good | — |
| Ex. 63 | PTFE Witcon TL6 | A | Simple Prototype | Good | 104.1 |
| Ex. 64 | PTFE Witcon TL6 | A | Complex Prototype | Good | 82.8 |
| Ex. 65 | PTFE Witcon TL6 | A | Functional Device | Poor | — |
| Ex. 66 | PTFE Witcon TL6 | B | Simple Prototype | Good | — |
| Ex. 67 | PTFE Witcon TL6 | B | Complex Prototype | Good | 83.3 |
| Ex. 68 | PTFE Witcon TL6 | B | Functional Device | Poor | 81.7 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents and other references are incorporated herein by reference in their entirety.

The invention claimed is:

1. A thermoset composition, comprising:
about 1 to about 70 parts by weight of a functionalized poly(arylene ether);
about 30 to about 98 parts by weight of an alkenyl aromatic monomer;
about 1 to about 69 parts by weight of an acryloyl monomer; and
about 5 to about 95 weight percent of a conductive agent;
wherein the parts by weight of the functionalized poly(arylene ether), the alkenyl aromatic monomer, and the acryloyl monomer sum to 100; and wherein the amount of the conductive agent is based on the total weight of the composition.

2. The thermoset composition of claim 1, wherein the functionalized poly(arylene ether) is a capped poly(arylene ether) having the structure $$Q(J-K)_y$$

wherein Q is the residuum of a monohydric, dihydric, or polyhydric phenol; y is 1 to 100; J comprises recurring units having the structure

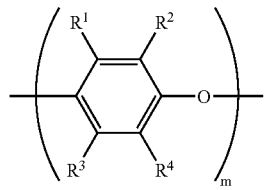

wherein $R^1$-$R^4$ are each independently selected from the group consisting of hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbonoxy, and $C_2$-$C_{12}$ halohydrocarbonoxy wherein at least two carbon atoms separate the halogen and oxygen atoms; m is 1 to about 200; and K is a capping group selected from the group consisting of

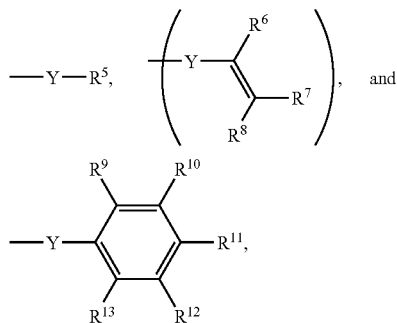

wherein $R^5$ is $C_1$-$C_{12}$ alkyl; $R^6$-$R^8$ are each independently selected from the group consisting of hydrogen, $C_1$-$C_{12}$ alkyl, $C_2$-$C_{12}$ alkenyl, $C_6$-$C_{18}$ aryl, $C_7$-$C_{18}$ alkyl-substituted aryl, $C_7$-$C_{18}$ aryl-substituted alkyl, $C_2$-$C_{12}$ alkoxycarbonyl, $C_7$-$C_{18}$ aryloxycarbonyl, $C_8$-$C_{18}$ alkyl-substituted aryloxycarbonyl, $C_8$-$C_{18}$ aryl-substituted alkoxycarbonyl, nitrile, formyl, carboxylate, imidate, and thiocarboxylate; $R^9$-$R^{13}$ are each independently selected from the group consisting of hydrogen, halogen, $C_1$-$C_{12}$ alkyl, hydroxy, and amino; and wherein Y is a divalent group selected from the group consisting of

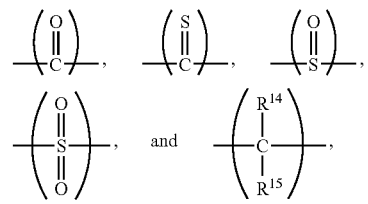

wherein $R^{14}$ and $R^{15}$ are each independently selected from the group consisting of hydrogen and $C_1$-$C_{12}$ alkyl.

3. The thermoset composition of claim 1, wherein the functionalized poly(arylene ether) is a ring-functionalized poly(arylene ether) comprising repeating units having the structure

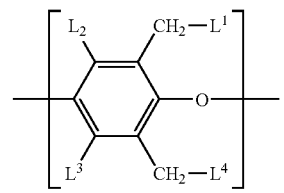

wherein each $L^1$-$L^4$ is independently hydrogen, an alkenyl group, or an alkynyl group; wherein the alkenyl group is represented by

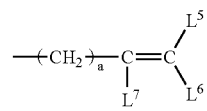

wherein $L^5$-$L^7$ are independently hydrogen or methyl, and a is an integer from 1 to 4; wherein the alkynyl group is represented by

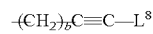

wherein $L^8$ is hydrogen, methyl, or ethyl, and b is an integer from 1 to 4; and wherein about 0.02 mole percent to about 25 mole percent of the total $L^1$-$L^4$ substituents in the ring-functionalized poly(arylene ether) are alkenyl and/or alkynyl groups.

4. The thermoset composition of claim 3, wherein each $L^1$-$L^4$ is independently hydrogen or the alkenyl group.

5. The thermoset composition of claim 3, wherein a is 1 and $L^5$-$L^7$ are hydrogen.

6. The thermoset composition of claim 3, wherein the functionalized poly(arylene ether) has a number average molecular weight up to about 10,000 atomic mass units.

7. The thermoset composition of claim 3, wherein the functionalized poly(arylene ether) has an intrinsic viscosity of about 0.15 to about 0.30 deciliters per gram measured at 25° C. in chloroform.

8. The thermoset composition of claim 3, wherein the alkenyl aromatic monomer has the structure

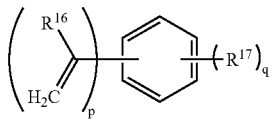

wherein each $R^{16}$ is independently selected from the group consisting of hydrogen, $C_1$-$C_{12}$ alkyl, $C_2$-$C_{12}$ alkenyl, $C_2$-$C_{12}$ alkynyl, and $C_6$-$C_{18}$ aryl; each $R^{17}$ is independently selected from the group consisting of halogen, $C_1$-$C_{12}$ alkyl, $C_1$-$C_{12}$ alkoxyl, and $C_6$-$C_{18}$ aryl; p is 1 to 4; and q is 0 to 5.

9. The thermoset composition of claim 3, wherein the acryloyl monomer comprises at least one acryloyl moiety having the structure

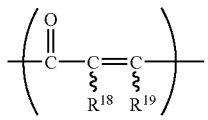

wherein $R^{18}$ and $R^{19}$ are each independently selected from the group consisting of hydrogen and $C_1$-$C_{12}$ alkyl, and wherein $R^{18}$ and $R^{19}$ may be disposed either cis or trans about the carbon-carbon double bond.

10. The thermoset composition of claim 3, wherein the acryloyl monomer comprises at least one acryloyl moiety having the structure

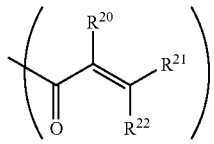

wherein $R^{20}$-$R^{22}$ are each independently selected from the group consisting of hydrogen, $C_1$-$C_{12}$ alkyl, $C_2$-$C_{12}$ alkenyl, $C_6$-$C_{18}$ aryl, $C_7$-$C_{18}$ alkyl-substituted aryl, $C_7$-$C_{18}$ aryl-substituted alkyl, $C_2$-$C_{12}$ alkoxycarbonyl, $C_7$-$C_{18}$ aryloxycarbonyl, $C_8$-$C_{18}$ alkyl-substituted aryloxycarbonyl, $C_8$-$C_{18}$ aryl-substituted alkoxycarbonyl, nitrile, formyl, carboxylate, imidate, and thiocarboxylate.

11. The thermoset composition of claim 3, wherein the acryloyl monomer comprises at least two acryloyl moieties.

12. The thermoset composition of claim 3, wherein the acryloyl monomer comprises at least three acryloyl moieties.

13. The thermoset composition of claim 3, wherein the conductive agent is selected from the group consisting of graphite, conductive carbon black, conductive carbon fibers, metal fibers, metal particles, and particles of intrinsically conductive polymers.

14. The thermoset composition of claim 3, wherein the conductive agent comprises graphite.

15. The thermoset composition of claim 3, wherein the conductive agent comprises conductive carbon fibers having an average diameter of about 3.5 to about 500 nanometers.

16. The thermoset composition of claim 3, further comprising an additive selected from the group consisting of flame retardants, flame retardant synergists, mold release agents and other lubricants, antioxidants, thermal stabilizers, ultraviolet stabilizers, pigments, dyes, colorants, anti-static agents, fibrous reinforcements, disc-shaped fillers, low-aspect ratio fillers, synthetic resins, natural resins, thermoplastic elastomers, low profile additives, and combinations thereof.

17. A thermoset composition, comprising:
about 10 to about 50 parts by weight of a methacrylate-capped poly(arylene ether);
about 40 to about 80 parts by weight of a monofunctional alkenyl aromatic monomer;
about 5 to about 50 parts by weight of a polyfunctional acryloyl monomer;
about 1 to about 5 parts by weight of a curing catalyst; and
about 20 to about 95 weight percent of graphite;
wherein parts by weight of the methacrylate-capped poly(arylene ether), the monofunctional alkenyl aromatic monomer, the polyfunctional acryloyl monomer, and the curing catalyst are based on 100 total parts for the methacrylate-capped poly(arylene ether), the monofunctional alkenyl aromatic monomer, and the polyfunctional acryloyl monomer; and wherein the weight percent of the graphite is based on the total weight of the composition.

18. A thermoset composition, comprising:
a capped poly(arylene ether) comprising a capping group having the structure

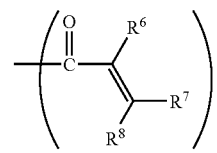

wherein $R^6$-$R^8$ are each independently hydrogen or $C_1$-$C_{12}$ alkyl;
an alkenyl aromatic monomer;
an acryloyl monomer; and
a conductive agent.

19. A thermoset composition, comprising:
a functionalized poly(arylene ether);
an alkenyl aromatic monomer;
an acryloyl monomer comprising at least one acryloyl moiety having the structure

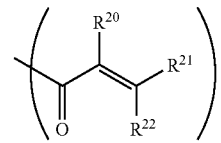

wherein $R^{20}$-$R^{22}$ are each independently selected from the group consisting of hydrogen, $C_1$-$C_{12}$ alkyl, $C_2$-$C_{12}$ alkenyl, $C_6$-$C_{18}$ aryl, $C_7$-$C_{18}$ alkyl-substituted aryl, $C_7$-$C_{18}$ aryl-substituted alkyl, $C_2$-$C_{12}$ alkoxycarbonyl, $C_7$-$C_{18}$ aryloxycarbonyl, $C_8$-$C_{18}$ alkyl-substituted aryloxycarbonyl, $C_8$-$C_{18}$ aryl-substituted alkoxycarbonyl, nitrile, formyl, carboxylate, imidate, and thiocarboxylate; and
a conductive agent.

20. A thermoset composition, comprising the reaction product of:
- about 1 to about 70 parts by weight of a functionalized poly(arylene ether);
- about 30 to about 98 parts by weight of an alkenyl aromatic monomer;
- about 1 to about 69 parts by weight of an acryloyl monomer; and
- about 5 to about 95 weight percent of a conductive agent;

wherein the parts by weight of the functionalized poly(arylene ether), the alkylene aromatic monomer, and the acryloyl monomer sum to 100; and wherein the amount of conductive agent is based on the total weight of the composition.

21. The composition of claim 20, wherein the composition after curing has a glass transition temperature of at least about 120° C.

* * * * *